Jan. 19, 1932.  F. G. L. BOYER  1,842,243
VENDING MACHINE
Original Filed March 30, 1925   10 Sheets-Sheet 1

INVENTOR.
Frederick G. L. Boyer

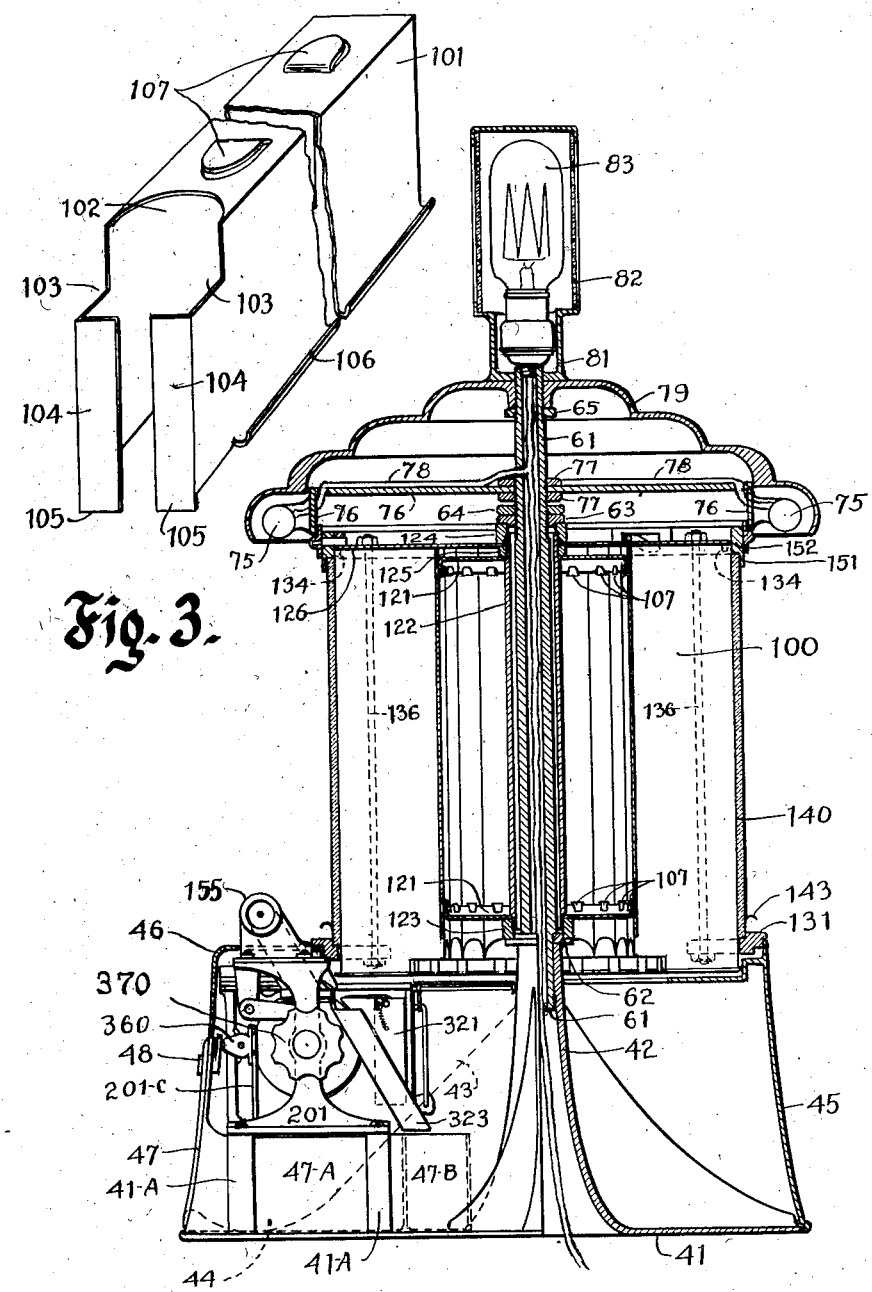

Jan. 19, 1932.  F. G. L. BOYER  1,842,243
VENDING MACHINE
Original Filed March 30, 1925  10 Sheets-Sheet 3
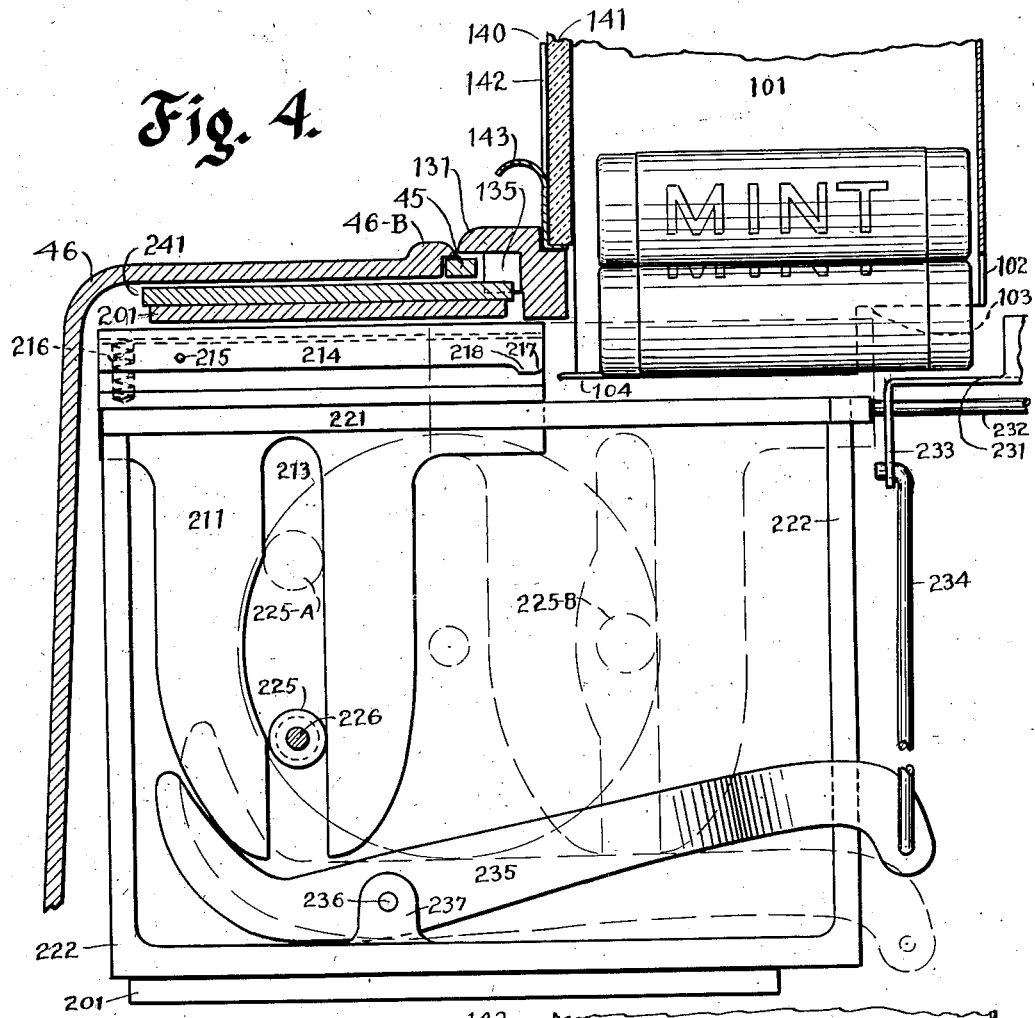
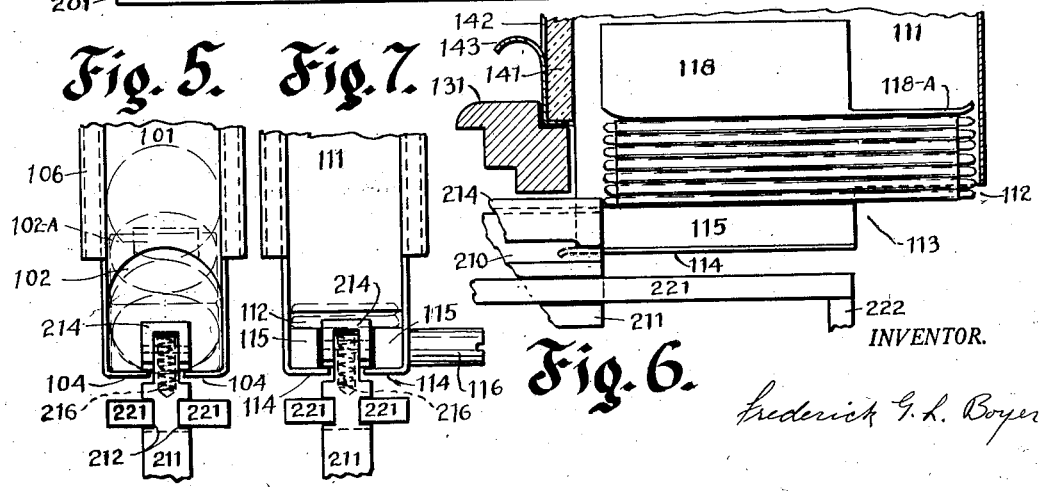
INVENTOR.
Frederick G. L. Boyer Jan. 19, 1932.  F. G. L. BOYER  1,842,243
VENDING MACHINE
Original Filed March 30, 1925    10 Sheets-Sheet 4

INVENTOR.
Frederick G. L. Boyer

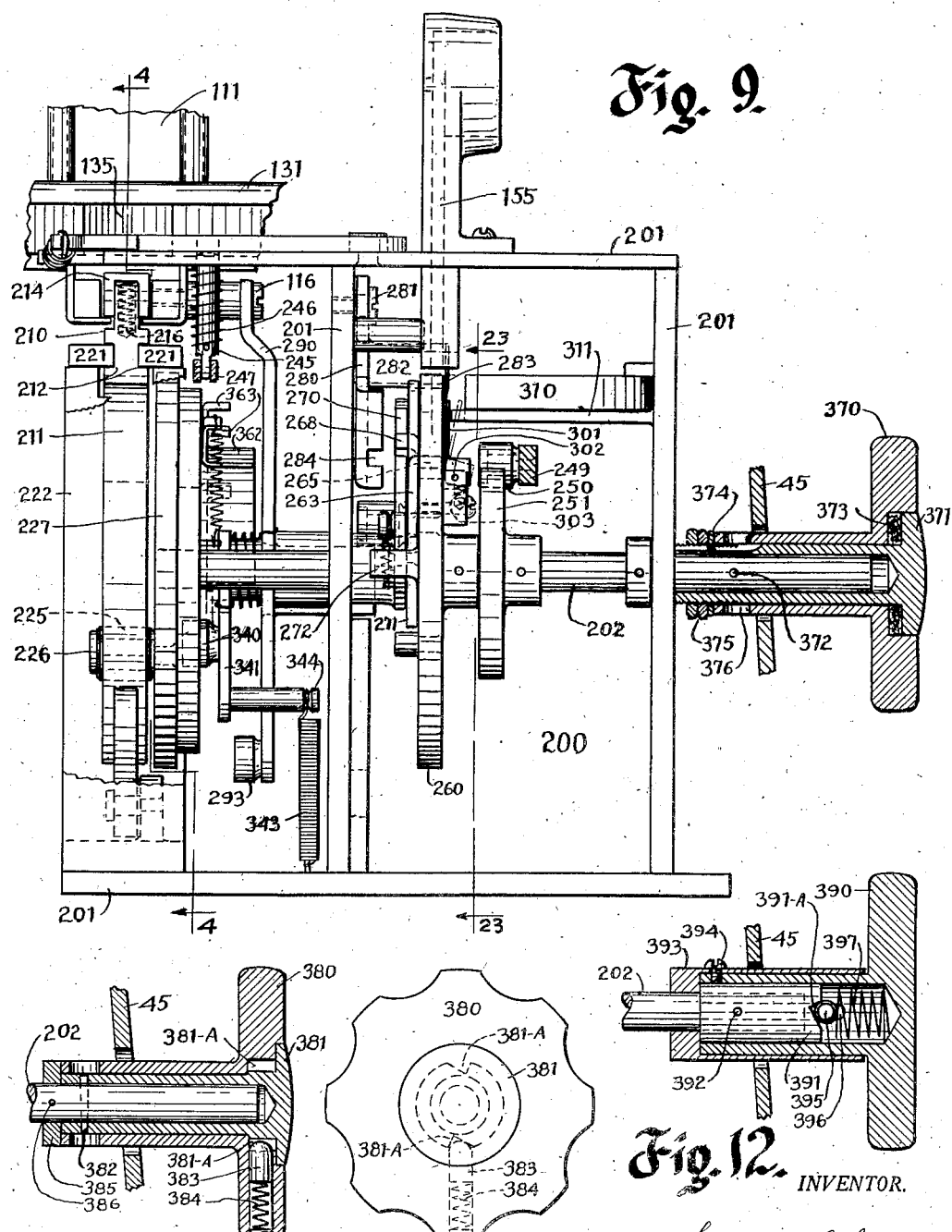

Jan. 19, 1932.　　F. G. L. BOYER　　1,842,243

VENDING MACHINE

Original Filed March 30, 1925　　10 Sheets-Sheet 6

INVENTOR.
Frederick G. L. Boyer

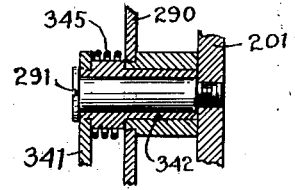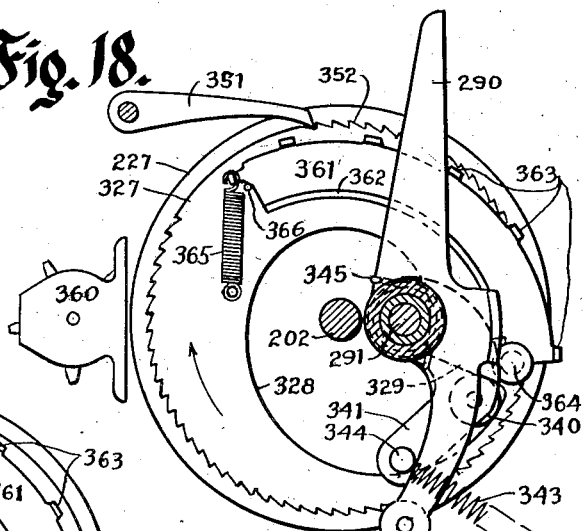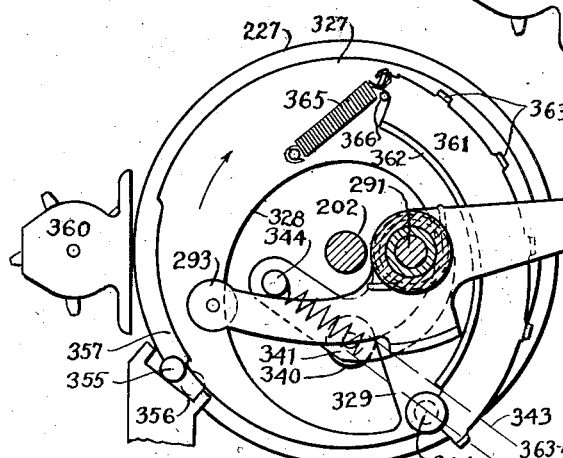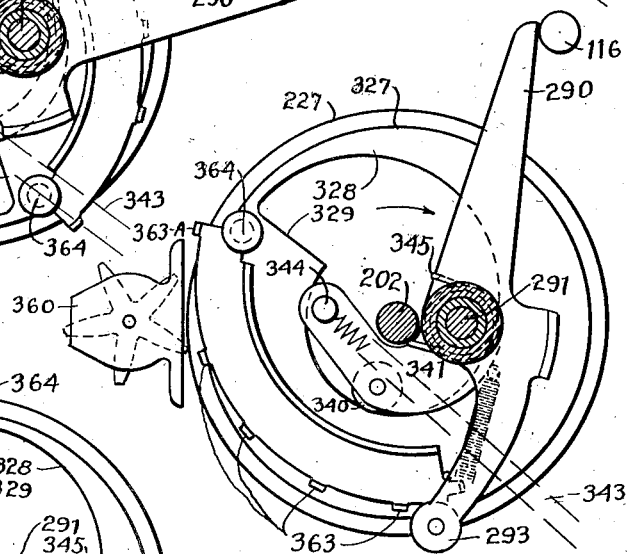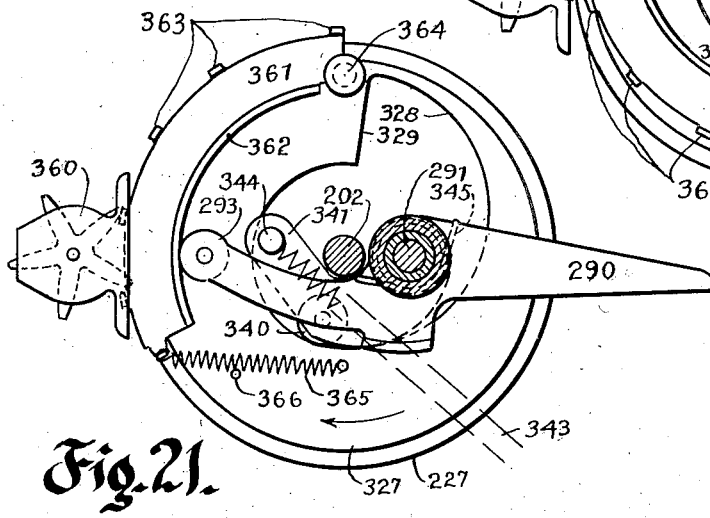

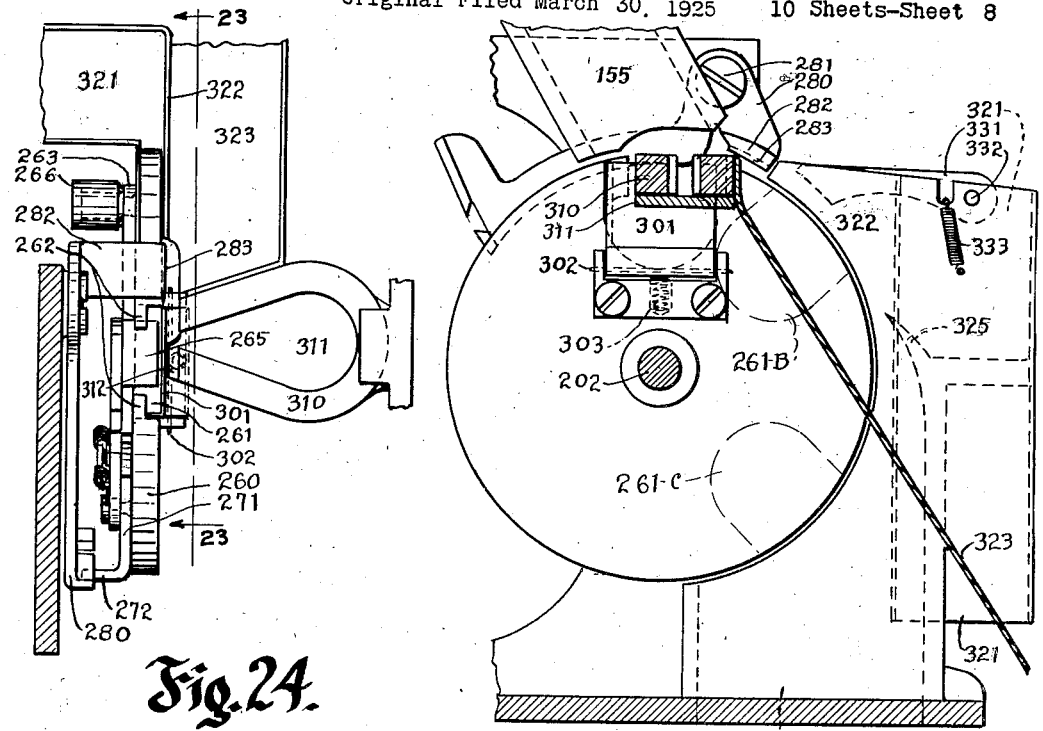
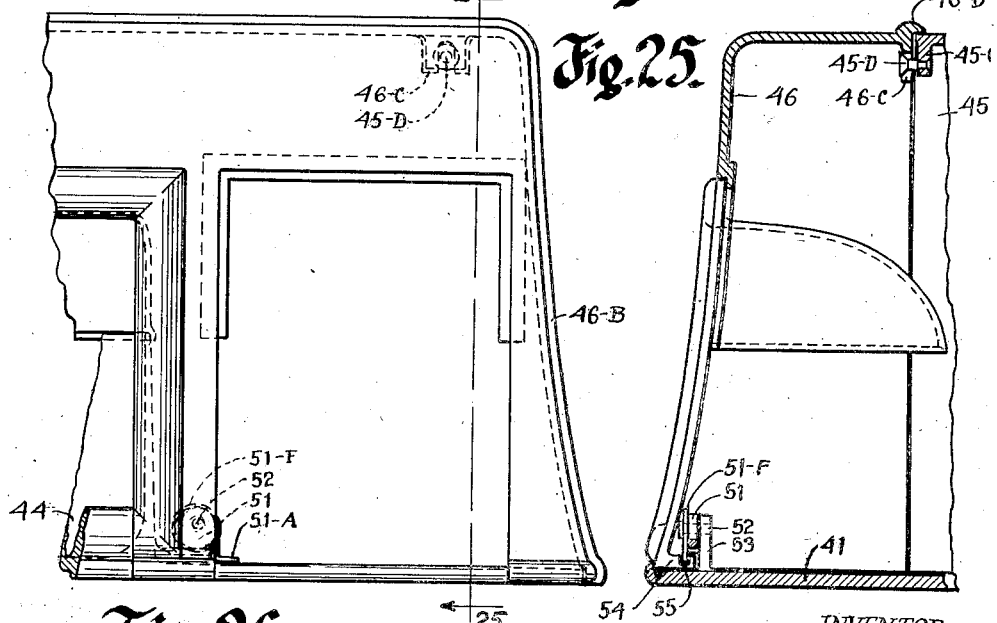

Jan. 19, 1932. F. G. L. BOYER 1,842,243
VENDING MACHINE
Original Filed March 30, 1925  10 Sheets-Sheet 9

INVENTOR.
Frederick G. L. Boyer

Patented Jan. 19, 1932

1,842,243

UNITED STATES PATENT OFFICE

FREDERICK G. L. BOYER, OF DAYTON, OHIO, ASSIGNOR TO ROLLYN H. BAKER AND GRANT W. NICHOLAS, BOTH OF DAYTON, OHIO

VENDING MACHINE

Application filed March 30, 1925, Serial No. 19,429. Renewed April 1, 1931.

My invention relates to coin controlled vending machines, and has for its prime object the provision of a single machine which will give the customer the opportunity to select from a considerable variety of different kinds of merchandise, the particular kind which he desires to purchase. A further object of the invention is the provision of a single machine which will vend, not only various kinds of merchandise, but also articles of merchandise having different selling prices, and further provision for accepting different denominations of coins in the same machine. Another object of the invention is the provision for vending merchandise of the various kinds and prices mentioned by means of a single coin-controlled delivery mechanism, for the sake of simplicity and economy in the construction of the machine. Still other objects of the invention consist in the provision of various novel structures for the sake of simplifying the mechanism, providing economies in construction, safeguarding the machine against abuse, etc., etc. The methods of attaining all of these and other detailed objects of my invention will be made clear by further reference to these specifications and claims.

One field of particular usefulness for my machine is in the vending of such articles of merchandise as chewing gum and candies such as are commonly sold in small factory wrapped packages, though it could be equally well used in vending other articles, such as, for example, cigarettes and tobaccos in stamped packages. When using my machine for vending chewing gum and candies I provide for vending chewing gum in one cent sticks and in five cent packages as well as wrapped candies in five cent packages, and, if desired, also in ten cent packages. This makes it possible for a customer desiring chewing gum and lacking a five cent coin, to purchase the same article in single sticks at one cent each, whereas a machine designed to take only one denomination of coin could not be used in such a case.

In order to provide a neat and compact machine which will vend a considerable variety of different articles, I provide that articles of one kind shall be placed in a stack from which they are fed, one at a time, by the coin controlled delivery mechanism. I then provide that the desired number of these stacks shall be mounted in a rotatable frame, forming what I call a magazine, and further provide a glass windowed cover for the front of each stack so that the customer can see the kind and quantity of goods in the stack. I then provide a single coin controlled delivery mechanism designed to accept, as a condition of its operation, any of the coins required for the purchase of any of the goods contained in the magazine, the denomination of coin required at any particular operation being determined at the beginning of the operation according to the selling price of the goods being sold at that particular operation. This coin controlled mechanism reciprocates a plunger which is adapted to remove, one at a time, the articles from any one of the stacks which may be placed in operative relation therewith, whether the stack contains single sticks of chewing gum, or whole packages of chewing gum or candy. I arrange the magazine so that the customer can rotate it until he brings the stack containing the goods he desires to purchase into operative relation with the coin controlled delivery mechanism. When he has done this he merely has to insert the proper coin and turn the hand wheel on the delivery mechanism. I further provide interlocks for preventing the shifting of the magazine after the delivery mechanism has been turned away from its normal position, and for preventing the operation of the delivery mechanism unless one of the stacks is in operative relation therewith. In case a customer unfamiliar with the machine should insert the wrong coin for the stack of goods which he had set to position, I provide mechanism for returning to the customer any coin which is not of the proper dimension to permit operation of the delivery mechanism. In case an attempt is made to operate the machine with steel slugs in place of coins, however, I provide that these shall be rejected by the mechanism and retained inside the machine to prevent continued attempts to operate the machine with a single slug. To prevent the placing of adhesive on a coin for causing the coin to stick in the mechanism and make possible repeated purchases with the same coin I provide means for positively ejecting from the mechanism every coin and slug inserted, improper coins and steel slugs being ejected as before mentioned, and proper coins which have permitted operation of the mechanism being ejected therefrom in the normal operation of the machine at a place where they will fall into the coin box provided for the purpose. I also provide suitable mountings, housings, locks, and other features which will presently be described in detail, and will be better understood by reference to the accompanying drawings in which:

Fig. 2 is a sectional view, showing the base only in quarter section, showing the construction of the magazine and its relation to the delivery mechanism, and showing a modified form of canopy over the top of the magazine, having provision for electric lights to illuminate the fronts of the stacks in the magazine.

Fig. 3 is a detail, in perspective, of one of the stacks for containing the goods to be sold, showing how the hooks for mounting the stacks in the magazine are formed out of the sheet metal back of the stack.

Fig. 4 is a detail of the delivery mechanism and a part of the stack in operative relation therewith, the whole being a section taken on lines 4—4 of Fig. 9.

Fig. 5 is a front view of the stack and plunger showing, in light broken lines, two articles each, of rectangular, round, and oval goods, showing how one and only one of each of these may be pushed out of the stack at a time by the plunger.

Fig. 6 is a sectional view similar to a part of Fig. 4 but showing a stack arranged for dispensing single sticks of chewing gum and illustrating how the plunger shown in Fig. 4 is used to push single sticks out one at a time.

Fig. 7 is a view similar to Fig. 5 but showing the structure illustrated in Fig. 6.

Fig. 9 is a front view of the coin controlled delivery mechanism, showing also the bottom part of the stack from which it is set to deliver goods.

Fig. 10 is a sectional view of a modified form of safety hand wheel.

Fig. 11 is an end view of the same.

Fig. 12 is a sectional view of another modified form of safety hand wheel.

Fig. 18 shows the arm which determines what denomination of coin the mechanism should accept, the arm which operates that arm and also serves to return the mechanism from its locked to its normal position, and the cam for operating these arms. It also shows the counter and mechanism for actuating it a number of units corresponding to the value of the coin taken by the machine; and further shows a toothed ratchet for preventing a return of the mechanism after it is unlocked by a proper coin.

Figure 14:
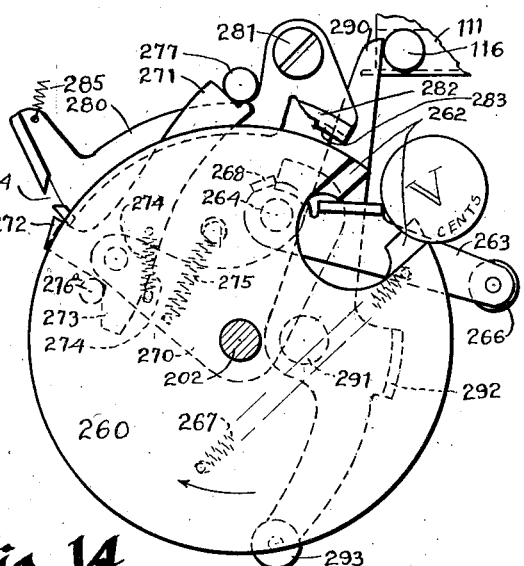
Fig. 14 shows the same parts in the position they assume when a stack containing one cent goods is in place and an attempt has been made to operate the mechanism by use of a five cent coin, the mechanism being locked and the coin ejected.

Fig. 19 shows the same parts in the position which they occupy when the mechanism is locked and the parts of the coin mechanism are in the position shown in Fig. 14 (except that in Fig. 14 the mechanism is locked for lack of a one cent coin whereas in the present figure it is shown as locked for lack of a five cent coin). This figure also shows how a roller ratchet may be used in place of the toothed ratchet shown in Fig. 18.

Fig. 20 shows the same parts in the position which they occupy when a one cent coin has permitted operation and the counter has just been actuated one unit by its operating segment.

Fig. 21 shows the same parts in the position which they occupy when a five cent coin has permitted operation and when the counter is about to be actuated for the last of the five units required to register the value of the coin taken.

Fig. 22 is a section of the mounting of the two arms shown in the preceding four figures, showing how the coin determining arm is caused to follow the movement of the other arm.

Fig. 23 is a sectional view on the lines 23—23 of Figs. 9 and 24, and shows the magnetic slug extractor, as well as certain other parts not clearly shown in the other views.

Fig. 24 is a plan view of the parts shown in Fig. 23.

Fig. 25 is a section taken on lines 25—25 of Fig. 26 and shows the housing covering the coin controlled delivery mechanism together with certain other parts of the machine, and the means for holding it in place without the aid of screws or other external fastenings.

Fig. 26 is a partial view of the same housing and fastenings.

Figure 27:
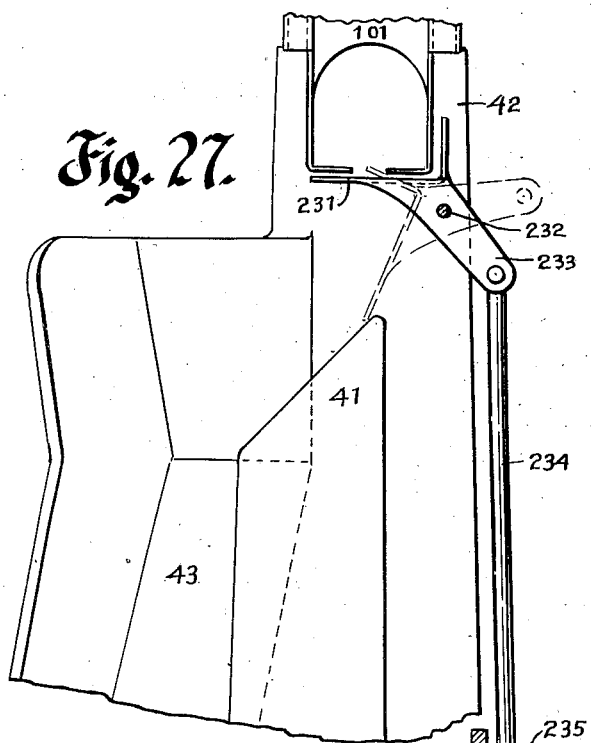

Fig. 27 is a partial view showing a front elevation of the shutter onto which the goods is pushed from the stack and which supports the goods retaining them inside the machine until the operation is complete.

Figure 28:
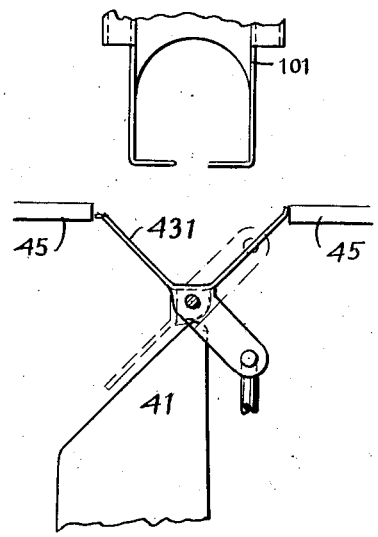

Fig. 28 shows a modified form of shutter which also serves to close the opening into the machine while the machine is not in use.

Figures 29, 30, 31:
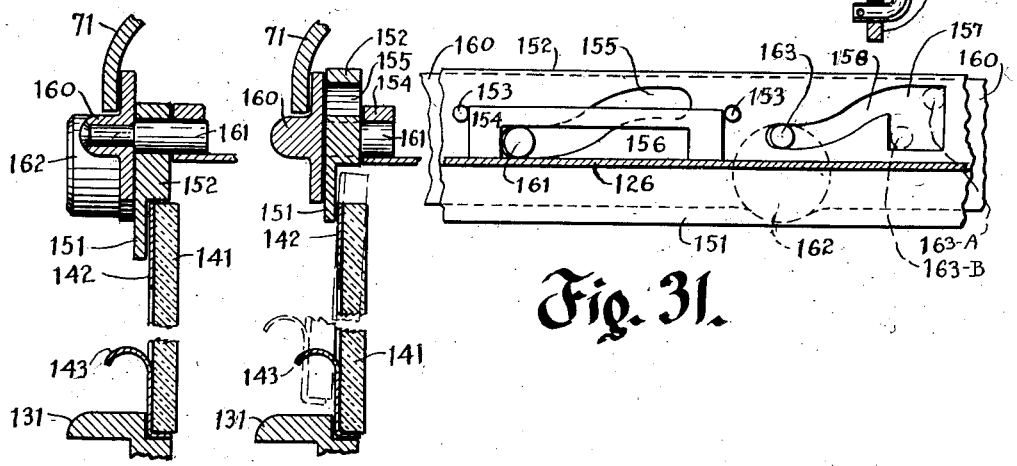

Fig. 29 is a partial section showing the covers covering the fronts of the stacks of goods, and the locking rings which hold these covers in position.

Fig. 30 is a section of the same, showing how the parts appear when the locking devices are released to permit removal of the covers, and showing in broken lines the manner in which the covers may then be removed.

Fig. 31 is an elevational view from within of the lock and the locking rings showing the provisions for locking the rings in place, and for lifting the clamping ring to release the covers.

Figure 32:
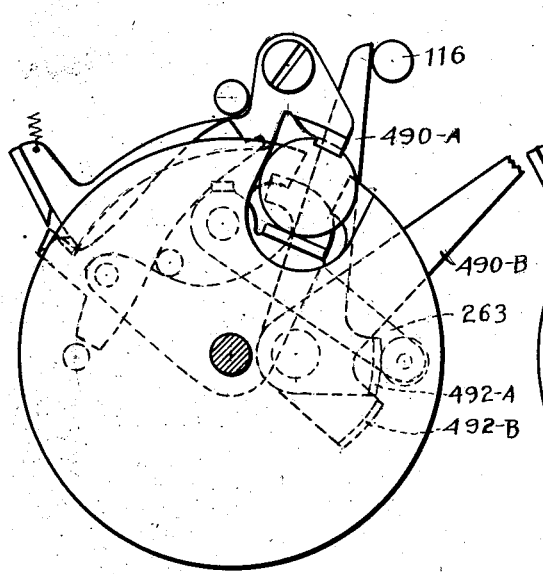

Fig. 32 shows a modified form of coin mechanism with provision for accepting any one of three different denominations of coin, in this case, one, five, and ten cent coins, shown in a position where a coin of middle dimension is unlocking the mechanism.

Figure 33:
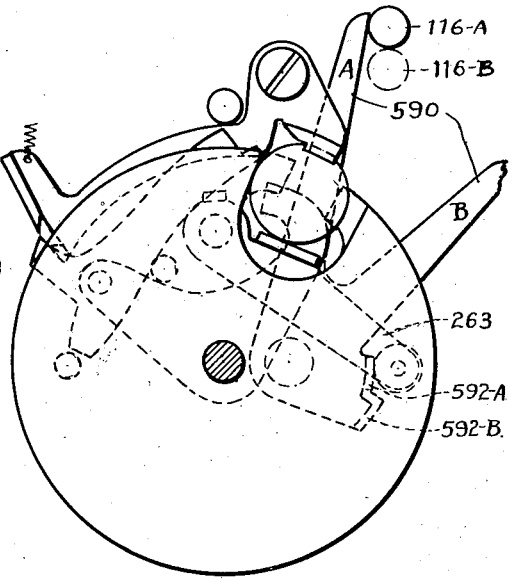

Fig. 33 shows a still further modified form of mechanism for accomplishing the same results as that shown in Fig. 32.

Figure 34:
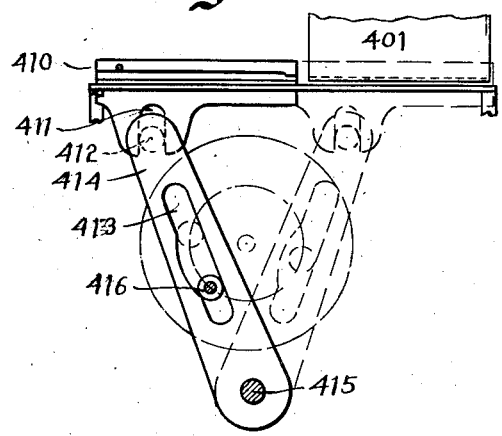

Fig. 34 shows a modified form of delivery mechanism which gives the plunger sufficient stroke to push the entire distance through the stack, without using a larger crank disc.

Figure 35:
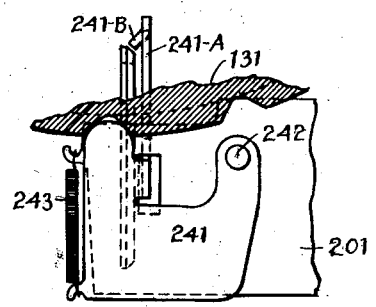

Fig. 35 is a plan view of a modified and simplified form of interlock between the magazine and coin controlled delivery mechanism, for preventing a shifting of the magazine when the delivery mechanism is out of normal position and for preventing operation of the delivery mechanism unless one of the stacks in the magazine is in operative relation therewith.

Figure 36:
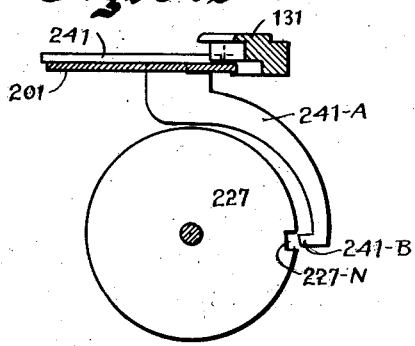

Fig. 36 is an elevational view of the mechanism shown in Fig. 35.

FRAMEWORK OF MACHINE

Figure 1:
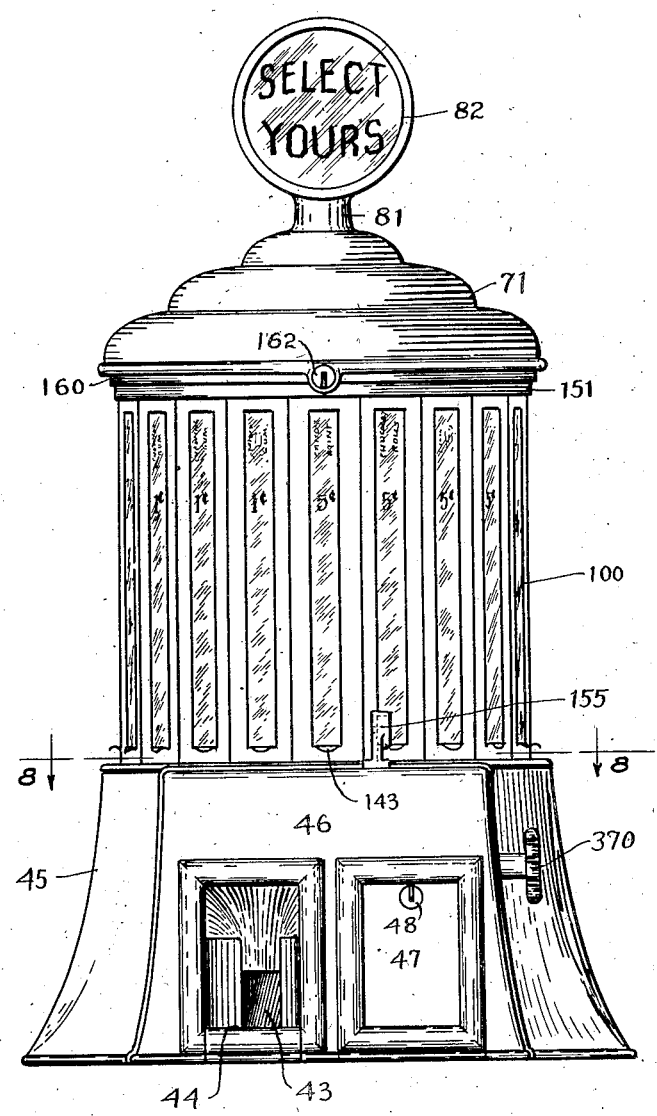
Fig. 1 is a front view of my machine as seen by the customer.

Referring first to Figs. 1 and 2 it will be seen that the machine is mounted on a suitable base 41 having a hollow column 42 rising therefrom and stiffened by suitable webs. Thereon and preferably integral therewith is formed an inclined slide 43 ending in a pocket 44 from which the goods may be taken by the customer. This base is surrounded and inclosed by a housing composed of section 45 firmly attached to the base by screws or other suitable means, and a removable front section 46 which is held in place by means which will presently be described. A coin drawer 47, provided with a suitable lock 48, slides in and is secured to this part of the housing. This drawer contains compartment 47—A for receiving coins, and compartment 47—B for receiving steel slugs.

In order to prevent any tampering with the machine it is desirable not only that locks be provided for parts containing money or goods, but that no screws or bolts be exposed in a way which would permit the disassembling of the machine and access to its interior. I therefore provide means for securing the front section 46 of the housing to the base 41 and housing 45 by screws or other fastenings in such a manner that the coin drawer 47 must be unlocked and removed before these fastenings are accessible. Because the removal of this section 46 of the housing gives access to the coin controlled delivery mechanism (which may be necessary for repair, or adjustment, or the removal of foreign objects which may be maliciously inserted) I prefer to make it easily detachable, and for this purpose I provide the fastenings shown in Figs. 25 and 26. It will be noted that a bead 46—B on housing 46 covers the joint between this housing and housing 45. One or more notched lugs 46—C are provided on housing 46 adapted to be hooked over conical headed studs 45—D secured in lugs 45—C on housing 45. These hold the top of housing 46 in place, and in order to hold the bottom thereof in place I provide an eccentric 51, mounted on pivot 52 in lug 53 on base 41, and having a handle 51—A by means of which it can be clamped down upon lug 54 on the bottom of housing 46. To prevent the bottom of housing 46 from being pulled outwardly and thus released from eccentric 51 I provide a flange 51—F, on the eccentric 51, which enters a notch 55 in lug 54. The handle 51—A on eccentric 51 is so arranged that the coin drawer 47 can not be placed in the machine without first clamping the eccentric down onto lug 54; and so that it can not again be released until the coin drawer is unlocked and removed. That is to say it is impossible to gain access to the interior of the machine without the use of a key.

Screwed into the hollow column 42 is a hollow spindle 61. This spindle passes through and holds in place a bearing ring 62 on which the magazine 100 is mounted to rotate as will hereinafter be described under the title of "Magazine mountings". At the height of the magazine the spindle 61 is threaded to receive a second bearing ring 63 which is secured in its place by a lock nut 64 and forms the upper bearing on which the magazine may be rotated. At its upper extremity spindle 61 is threaded and carries a nut 65 supporting the canopy 71 (Fig. 1) which is further held in place by the framework 81 of an electrically illuminated sign 82, which is screwed onto the spindle.

If desired, in place of the plain canopy 71 shown in Fig. 1, I provide for electric lights to illuminate the outside of the magazine. For this purpose I mount the lamps 75 (Fig. 2) on the rim of a solid or spoked disc 76 held in place on the spindle 61 by means of nuts 77, and which carries the wiring 78, preferably inclosed in suitable conduits, for supplying the current to the lamps 75. A slightly different form of canopy, 79, is provided with reflectors for the lights formed in such a manner that the lamps can not be removed while canopy 79 is in place. This is done for the purpose of preventing theft of the lamps. The wiring for supplying the current to the lamps 75 as well as to the lamp 83 illuminating sign 82 is carried down through the hollow spindle 61 and provided with a suitable plug at its end for attaching it to the supply of current.

There is little danger of persons gaining illegitimate access to the interior of the machine by unscrewing the sign 82, removing the canopy, all of the nuts and locknuts, and finally the magazine itself, but this can be prevented if desired. To do this the canopy is keyed to the spindle 61, the frame 81 of the sign, after being screwed into place, is screwed from below to the canopy to prevent its being unscrewed from the spindle 61. After the canopy is attached to the spindle in this manner, the magazine is set in place and the spindle with the canopy attached is thrust down through it and screwed into the base by means of the canopy, which, as before mentioned, is keyed thereto. Here it is held against removal by a screw (not shown) screwed through the side of column 42 into the spindle 61. This screw may be inserted and removed either through the opening where the coin drawer is removed or through the openings in one of the stacks of the magazine by removing its cover and contents.

MAGAZINE

As has been stated the magazine containing the goods to be sold is composed of a plurality of stacks, together with suitable mountings therefor. In describing the magazine (designated as a whole by the numeral 100) I will therefore first describe the individual stacks and then the mountings by means of which they are combined to form a single magazine.

Stacks for holding packages of goods

Fig. 3 is a perspective view of one of the stacks for containing five cent goods. This stack is formed of a single piece of sheet metal and is designated by the numeral 101, and is shown as resting on the open face or front and having its bottom towards the observer. There is an opening 102 at the lower end of the back which, as may be seen in Figs. 4 and 5 is of such form and size as to permit the passage of one and only one package of goods at a time, whether such goods be in the form of rectangular packages, as of chewing gum, or round or oval packages, as of candy mints or chocolates. In Fig. 5 two packages of each of these forms are shown in light broken lines and it will be seen that there is room for the one resting on the bottom of the stack to be pushed through from the front, but that the one above this can not possibly pass through the opening at the same time.

It is possible to modify the form and size of this opening if it is desired to accommodate still other sized and shaped packages of goods. For example, the additional space 102—A, indicated in Fig. 5 by the dot and dash line, might be cut out. This would not interfere with the use of the stack for the forms of goods above described and, by the simple expedient of placing strips inside of the sides of the tube to narrow it to the width of the opening 102—A, would permit the use of the stack for vending goods in packages considerably wider and at the same time considerably thinner than the width of the stack, by placing the packages on edge in the narrowed stack.

The rear lower corners 103 of both sides of the stack are also removed and the ends of the sides are bent inward to form a partial bottom on which the goods in the stack shall rest. There is a space left between the two portions 104 of the bottom, for a purpose which will be explained in connection with the description of the delivery mechanism. The corners 103 are cut out so that it will not be necessary to push a package of goods entirely through the stack in order to entirely remove it from the stack, as will be explained in the same connection.

To aid in supporting the stack on its mounting two oppositely extending tongues or hooks 107 are punched and formed out of the sheet metal back of each stack.

It should also be noted that the front edges 106 are rolled outward and backward. This is done for several reasons, viz.: It stiffens the edges and prevents buckling; it provides means for holding the opposite sides of the stacks apart by means of pins 134 (see Figs. 2 and 8) in the bottom ring and top plate of the mountings; and it prevents difficulty when goods are inserted into the stacks from the front.

Stacks for holding single sticks

Single sticks of chewing gum dispensed by this machine are much thinner than any of the packages provided for as above described. The stacks 111 used for containing single sticks are like those just described except that instead of the opening 102 there is a straight topped opening 112, (see Figs. 6 and 7) and the corners 113 are cut on a line with the top of the opening 112, and the sticks of chewing gum are supported by two blocks 115 attached to the bottoms 114, for reasons which will be described in connection with the delivery mechanism. A stud 116, which may serve as one of the screws holding said blocks 115 in place, projects from the front of one side as shown in Figs. 7 and 9. This is for the purpose of controlling the denomination of coin receivable, as will be described in connection with the coin controlled locking mechanism, and is found only on the sides of stacks containing goods having a selling price of one cent as distinguished from goods having a selling price of five cents.

Magazine mountings

Figure 8:
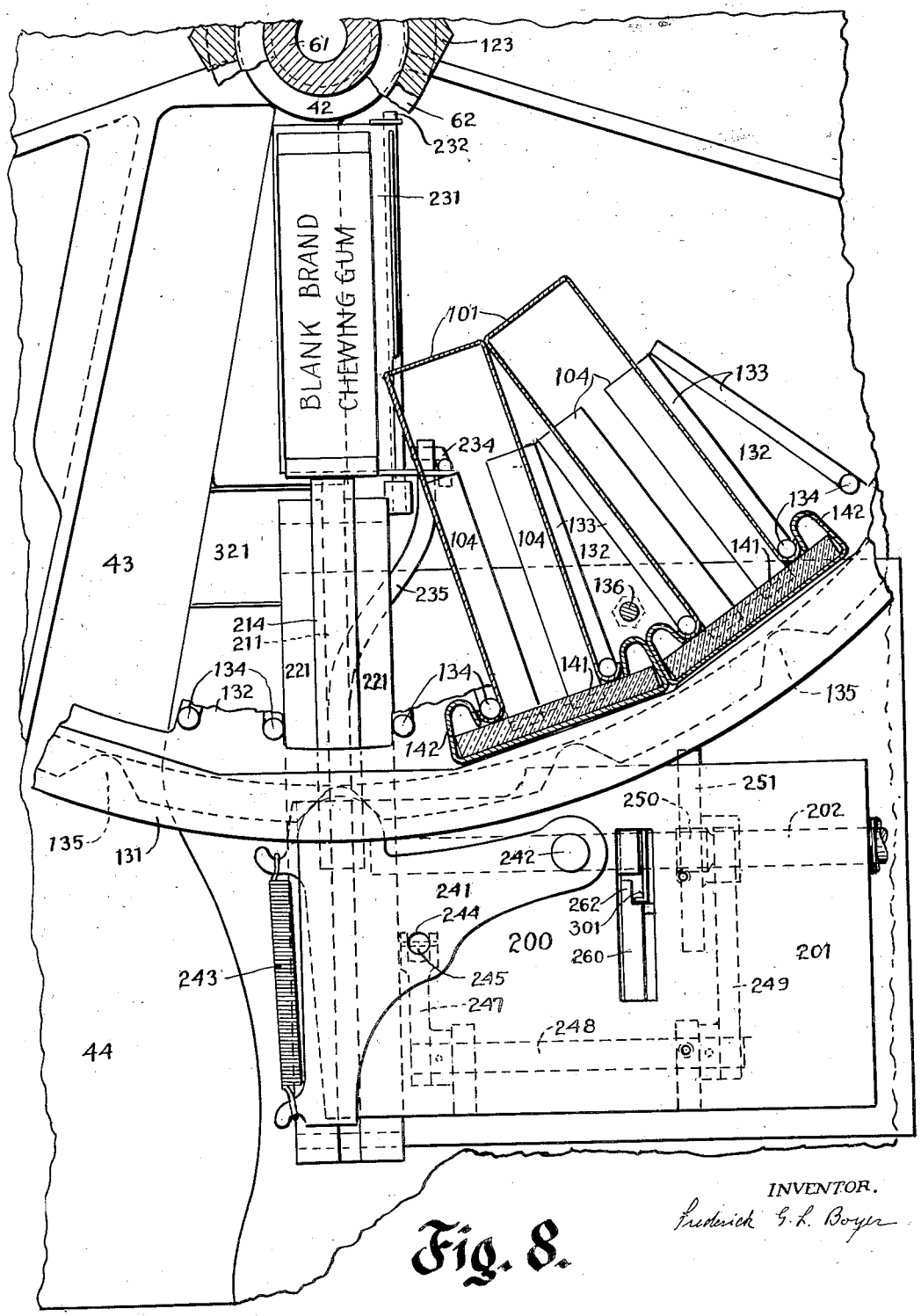
Fig. 8 is a partial section, on the line 8—8 of Fig. 1, having the cabinet and certain other parts removed or broken away to more clearly show the mechanism for centering the magazine and the interlocking devices between magazine and delivery mechanism.

The method in which the above described stacks are mounted to form a single magazine will be best understood by reference to Figs. 2 and 8. The stacks 101 and 111 which are to form the magazine are placed in a circle with their open sides outward. The lower hooks 107 are hooked over the flange of a flanged disc 121, while a second disc 121 is slipped downward engaging the upper hooks 107. These two discs are mounted on a hollow spindle 122, and secured by nuts 123, and 124 by means of collar 125, which hold the discs firmly against shoulders provided on the spindle. This is sufficient to hold the stacks together and form the magazine, but in order to provide supports for the covers required to close the fronts of the stacks, to provide means for locating the stacks in operative position, and to make the magazine more rigid, the following parts are added: A solid circular plate 126 is placed entirely over the top of the magazine and clamped between nut 124 and collar 125. A ring 131 is placed around the magazine at the bottom. This ring has inwardly extending portions or points 132 adapted to extend into the spaces between the stacks, and having upturned edges 133 which strengthen the stacks and hold them in their proper angular position. Upwardly projecting pins 134 engage the rolled edges 106 of the stacks and prevent the stacks from closing up and possibly causing the goods to bind therein. The ring 131 also contains a notch 135 corresponding to each stack in the magazine, which notches are used for locating the stacks in operative position, as will be hereinafter described under the heading of "Interlock". As may be seen the ring 131 rests under the rolled edges 106 of the stacks, and is held in this position by bolts 136 which clamp these edges of the stacks between ring 131 and plate 126.

It should be noted that the nuts 123 and 124 are formed to fit over and bear on bearing rings 62 and 63 carried by the spindle 61, and form the bearings on which the magazine may be rotated. The tightness of the bearing is adjusted by means of threaded ring 63 and lock nut 64.

Covers for magazine stacks

In order to facilitate replenishing the supplies of goods in the stacks, as well as to make it possible for customers and service men to easily determine the amount and kind of goods in any of the stacks, I have provided, as already described, that the front of each stack is open throughout its entire length, except as it is closed by the ring 131 at the bottom and certain other rings at the top, which will presently be described. In order to protect the goods in the magazine it is necessary to provide covers for the open sides of the stacks, and, because it is probable that it will seldom be desired to open all of the stacks at one time I have provided a separate cover for each stack. In order to avoid complication I provide means for locking all of the covers in place by means of a single lock, but for the reasons above set forth I provide that when the lock is unlocked the covers are retained in place except as they may be intentionally removed. To accomplish the second object for which the fronts of the stacks were left open I provide a glass window in the front of each cover.

To obtain the type of cover (designated as a whole by the numeral 140) above described in the simplest and most satisfactory manner possible I prefer to make the covers out of a single piece of sheet metal 142 properly formed, and a single piece of glass 141. This piece of sheet metal 142 has a hole in the front forming the window, and has its edges bent backward inclosing the edges of the glass 141, then bent forward again in a U shape to hold the glass in place, (see Fig. 8) and also to form a spring for causing the cover to fit snugly over the rolled edges 106 of the stack. The bottom of the front is bent backwards forming a support for the glass, but the top is left straight so the glass may be simply slipped out and replaced in case it should be broken. (See Figs. 4, 6, 29, and 30.) The metal at the bottom of the window is bent outward to form a thumb grip 143 which aids in removing the cover from the stack. (See also Fig. 1.)

Locking devices for stack covers

In order to retain the covers in place the ring 131 on which they rest is notched out to receive them, as shown in Figs. 2, 4, 6, 8, 29, and 30. The upper ends of the covers are held in place by a downwardly projecting part 151 of the ring 152, and they are held from being lifted out of the notches in ring 131 by contact with the ring 152 with their upper ends, as shown in Fig. 29. When it is desired to release the covers so they may be removed it is simply necessary to raise the ring 152 to the position shown in Fig. 30. When it is in this position it is possible, by means of the thumb grip 143, to lift the cover and pull it outward, as shown by the broken lines in this figure, until it is clear of the ring 131, and then pull it down until the top is below ring 151, when it may be entirely removed.

The ring 152 may be slid upward and downward as described but is held against circumferential sliding by the two pins 153 therein (see Fig. 31) which ride against the ends of a guide block 154 attached to the plate 126 covering the magazine.

The method of raising and lowering this ring to release and hold the covers 140 will now be described. Slidably mounted outside of the ring 152 is a ring 160 having studs 161 projecting inwardly therefrom through cam slots 155 in ring 152 and through horizontal slots 156 in guide block 154. This constrains ring 160 to slide circumferentially in a horizontal plane, and limits the distance which it can so slide. It will now be apparent that when ring 160 carrying stud 161 slides to the right in Fig. 31 it will force ring 152 downward to the position shown in Fig. 29, where it will hold the covers 140 against removal. Sliding the ring 160 in the opposite direction, however, will bring ring 152 to the position shown in Figs. 30 and 31 where the covers 140 are retained in position but may be removed.

It will now be apparent that locking the ring 160 against circumferential sliding, when it is in the position shown in Fig. 29, will securely lock all of the covers 140 against removal. To accomplish this locking a lock 162 is provided. This lock carries a pin 163 which, in unlocked position, is vertically above the center of the lock as shown in Fig. 31. When the ring 160 is slid to the right the pin 163 will follow the slot 158 into the opening 157 in the ring 152, and will be in the position (relative to the slot 158) shown by the broken lines 163—A. The lock 162 may then be locked by turning it counter-clockwise (as seen in the figure) and bringing pin 163 to the position 163—B (relative to slot 158 and opening 157). All of the covers 140 will then be locked in position so they can not be removed without a key to the lock 162.

It should be noted that a suitable number, preferably three, of the cam slots 155, studs 161, and guide blocks 154 are provided for properly guiding and holding the rings 152 and 160, but that a single lock 162, locking pin 163, and opening 157 and slot 158 in the ring 152 are sufficient.

It should also be noted that ring 160 is formed so that canopy 71 (or ring 76 in Fig. 2) comes down over over a portion thereof and fits into a corner therein, thus preventing the insertion of a knife or other instrument in an attempt to interfere with the mechanism. Suitable clearance is provided between canopy 71 and ring 160 so that the ring can rotate with the magazine while the canopy remains stationary.

COIN CONTROLLED DELIVERY MECHANISM

*Removable method of mounting in machine*

The mechanism which is used to remove the goods sold piece by piece from the stacks is designated as a whole by the numeral 200 and is most clearly shown in Figs. 2, 4, 5, 6, 7, 8, and 9. For convenience in assembling it is desirable that it be possible to assemble the magazine and the frame of the machine as a unit, and the coin controlled delivery mechanism as a separate unit, in such a manner that they may then be placed together with the assurance that they will co-operate properly. That the magazine and the frame can be so assembled is apparent from the foregoing description, and in order that the delivery mechanism may be separately assembled I provide a separate frame 201 therefor, on which the entire mechanism, including the coin chutes, hand wheel, and the centering device for the magazine is mounted. After assembling, the frame carrying the entire mechanism is attached to suitable supports 41—A forming a part of the base 41. (See Fig. 2.) We can be assured that it will properly co-operate with the magazine because the centering devices for the magazine (hereinafter described under the title of "Interlock") are mounted on the frame 201 so as to always center one of the stacks in the magazine where it will be in alignment with the delivery mechanism about to be described. To do this it is merely necessary to properly align the centering and delivery devices on the frame 201 before inserting this frame into the machine. After this is done a stack which is located by the centering device must be in line with the delivery mechanism.

It may be further observed that there is another important advantage of the removable coin controlled delivery mechanism. This makes this mechanism interchangeable, i. e., it is possible to remove it entirely from a machine and replace it by another, with the assurance that it will co-operate as properly with the magazine, as did the one originally in the machine. The advantage of this is due to the fact that the coin controlled mechanism is more liable to damage and disorder than is the magazine, because it is the part of the machine to which the customer has access, through the hand wheel and coin chute, with the consequent possibility of the introduction of foreign substances into the mechanism. It is therefore a great advantage if a disabled coin mechanism, which is comparatively small, can be removed from the machine and replaced by a new one without removing the whole machine to the repair shop. It should be noted that this removal of the coin controlled mechanism from the machine is facilitated by the easily removable housing 46 which covers this mechanism, as already described.

*Method of removing packages of goods from the stacks*

As has already been explained the stacks 101 and 111 for containing the goods to be sold have openings 102 and 112 in their sides toward the axis of the magazine, such that just one piece at a time of the goods in the stacks can be pushed out through these openings. It will be seen by reference to the figures that the bottom of ring 131, on which the stack covers 140 rest, is some distance above the bottoms 104 of the stacks. Reference to Fig. 2 will show that this opening in the bottom of the front of each stack is closed against access from the outside of the machine by a part of the housing 45.

A reciprocating plunger designated as a whole by the numeral 210 is used to push the goods out through the openings provided therefor in the stacks. In its normal position this plunger stands, as shown in Fig. 4, directly in front of the stack which is set to co-operate with it, and directly beneath ring 131. When in this position it is clear that the magazine can be rotated to bring any other stack desired into operative relation with the plunger. The plunger 210 is composed of a body 211 having guide grooves 212 in opposite sides thereof, and having a specially formed slot 213 by means of which it is reciprocated in a manner presently to be described. The body 211 is so formed that, when the plunger is reciprocated to remove a package of goods from one of the stacks, it projects upward through the slot left (as explained in the description of the stacks for holding packages of goods) between the two portions 104, or 114, of the bottom of the stack. It is arranged to project upward through the bottom of the stack in this way in order to prevent the plunger from riding up over any part of the goods or its wrappings and leaving some part of the goods or wrappers in the stack to cause trouble later.

It is quite possible that imperfections in the construction of the magazine would cause the bottoms of different stacks therein to stand at different levels as they are brought into operative relation with the plunger 210. This might, in some cases, cause the top front (i. e. the forward end as it is moving on its active stroke) corner of the plunger to be so high above the bottom of the stack as to cause it to catch the piece above the one which should be removed, and in other cases, to be so low as to slip under the piece which should be removed instead of gripping it properly in order to push it from the stack. In order to prevent any such difficulty I provide an inverted trough shaped cap 214 which forms the top front corner which determines what shall and what shall not be caught by the plunger. I provide that this cap 214 shall be self-adjusting so that its top front corner shall always be exactly the same distance above the bottom of the stack, even though the height of the bottom of the stack should vary. This self-adjustability is provided by attaching cap 214 to the body 211 by means of a pivot 215 in such a way that the forward end of cap 214 can move upward or downward a suitable distance from its normal position shown in Fig. 4. A spring 216 is provided under the rearward end of the cap 214 for always holding the forward end down in contact with the bottom of the stack. In Fig. 4 it is shown in the position it would occupy if resting on the bottom of a stack of normal height, and not in the position in which it would ordinarily be held by spring 216 when the plunger is in the position shown. The front lower corner of the cap 214 may be beveled as shown at 217, or the projecting end of the stack bottoms 104 may be bent down as shown, or both, in order to cause the cap 214 to ride up onto the stack bottom when the stack is higher than normal. After a foot 218 of suitable size has been left on the forward end of cap 214 the lower edges of this cap are cut away so that, if the stack is higher than normal, the contact of the cap 214 with the bottom of the stack will still be at the forward end of the plunger at 218, and the forward end of the cap 214 will not be lifted too high by a contact too close to pivot 215.

The plunger 210 is properly guided in its reciprocating movements by stationary guides 221 mounted on supports 222 supported by the frame 201 of the delivery mechanism 200.

The reciprocating movement is imparted to the plunger 210 by means of a roller 225 on crank pin 226 which is mounted on disc 227 attached to main shaft 202 of the coin controlled delivery mechanism, and adapted to be rotated one complete revolution, in a clockwise direction as seen in Fig. 4, at each operation of the machine. It is shown in its normal position in Fig. 4. It should be noted that it can be rotated to bring roller 225 to the position designated 225—A without moving the plunger, in fact without permitting movement of the plunger, because the plunger as shown in the figure has been withdrawn to the limit of its motion. This amount of movement of the shaft 202 and crank pin and roller 226 and 225 is used in the measuring of the coin and the locking or unlocking of the mechanism, as will be explained in describing the coin control, and consequently the movement of the plunger dare not begin until the roller 225 has passed the point 225—A. When the roller 225 reaches the point 225—B the plunger has been carried to the position indicated by broken lines in Fig. 4. It will be seen that, when the plunger has reached this position, the goods has been pushed far enough from the stack to be opposite the cut out parts 103 and entirely beyond the stack bottoms 104. There being thus no further support for the goods it drops from the stack.

The length of movement of the plunger 210 required to push the goods from the stack will thus be seen to be much less than the length of the goods being pushed from the stack. It is made this way for several reasons. In the first place it permits all parts of the plunger and its guides, and the crank disc 227 to be smaller and neater. In the second place the goods can be removed from the stack without striking the center column 42, thus avoiding the necessity of making the diameter of the magazine more than four times the length of the goods, or notching out the center column to make room for the goods as it is pushed from the stacks.

*Method of removing single sticks of chewing gum from a stack*

This same plunger 210 is used to remove single sticks of chewing gum from the stacks. As will be seen in Figs. 6 and 7 the blocks 115 in the bottom corners of the stacks containing the single sticks of chewing gum raise the pile of sticks so that the plunger 210 can strike and push out the bottom stick only, and so that the second stick can not be pushed out through opening 112 until the first stick has been removed and another operation of the plunger pushes out the second stick in the same manner. It should be noted that the space between the blocks 115 is wider than then the space between the stack bottoms 114 proper, thus making it possible for the plunger cap 214 to ride on the bottoms 114, as on bottoms 104, and between blocks 115, projecting just enough above them to catch one and only one stick. If the sticks used were thicker or thinner they could be removed from the stack by means of the same plunger by simply making blocks 115 and opening 112 of the proper height. The single sticks being very light, a weight 118 may be provided to cause them to drop down and feed out properly. The bulk of this weight should be over the supports for the goods to prevent any tendency to cause the overhanging ends to sag and cause trouble. A flat bottom 118—A covering the entire surface of the goods in the stack may be provided, however. It should further be noted that the front lower corner is beveled so that the plunger can push its way under the weight in case the mechanism should be operated after the removal of the last piece of goods from the stack.

*Shutter for supporting goods removed from stacks*

From what has already been said it will be seen that the plunger 210 removes the goods sold from the stack during the first part of the operation of the machine, i. e. the first part of the revolution of shaft 202, and returns to normal position during the completion of the operation. If the goods were delivered to the customer as soon as removed from the stack by the plunger 210 it is not likely that the customer would turn the mechanism far enough to complete the operation. This would be almost certain to leave the plunger 210 in the stack so that it would be impossible for the next customer to shift the magazine.

In order to compel each customer to complete the operation of the machine I provide means for retaining the goods in the machine and preventing its delivery to the customer until the operation of the machine is complete. The mechanism by which this is accomplished is best shown in Figs. 4, 8, and 27. A shutter 231 is mounted so that the goods from the stack will slide out upon it when pushed out of the stack by the plunger 210. When the plunger 210 returns to its normal position the operation of the machine is complete and the shutter 231 is rocked on the shaft 232, which is attached to the frame 222, to the position shown by broken lines in Fig. 27. The goods then slides off of the shutter 231 down the slide 43 into the pocket 44 in the base 41, where it is accessible to the customer.

The shutter 231 is rocked at the proper times by means of the arm 233 attached thereto and operated by a pitman 234, attached at its other end to a lever 235 mounted to rock on a pivot 236 journaled in a lug 237 on the frame 222. This lever 235 is operated directly by the body 211 of the plunger 210. When the plunger returns to the normal position shown in Fig. 4 it strikes the end of lever 235 rocking it in a counter-clockwise direction and tipping the shutter 231 to the position shown by broken lines in Fig. 27. In Fig. 4 the shutter is shown, for the sake of clearness, in the position shown by the solid lines in Fig. 27, and the pitman 234 is broken to indicate the fact that the shutter is not in the position indicated by the position of lever 235. When plunger 210 is moved away from its normal position it soon rocks arm 235 in a clockwise direction to the position indicated by broken lines in Fig. 4, thus bringing shutter 231 to the position shown by solid lines in Figs. 4 and 27, in ample time to support the goods being pushed out of the stack by the plunger.

A modified form of shutter is shown in Fig. 28. The method of operation is exactly the same as that just described but the shutter 431 is made of a V shape and so mounted that when rocked to the position indicated by the broken lines in order to deliver the goods to the customer it will close up the opening between the horizontal parts of the base housing 45 and prevent any possibility of access to the inside of the machine by means of bent wires or the like, during the time when the machine is standing idle.

Interlock

It is obvious that operation of the plunger 210 and the rest of the mechanism must not be permitted except when one of the stacks is in operative relation therewith. It is also obvious that rotation of the magazine 100 must not be allowed except when the delivery mechanism, and particularly plunger 210, is in its normal position, for if an attempt were made to rotate the magazine when the plunger was entered in one of the stacks there would be danger of deforming the stack bottoms and doing other damage to the mechanism. It is also desirable that there be some device for aiding the customer in setting the magazine to exactly the proper place for the plunger to enter one of the stacks.

I prefer to accomplish all of these objects with a single mechanism as shown in Figs. 4, 8, and 9. As already mentioned there is in ring 131 a notch 135 corresponding to each of the stacks 101 and 111. An arm 241, adapted to enter any one of these notches and hold the corresponding stack in operative relation with the delivery mechanism, is mounted on pivot 242 on the top of frame 201 of the delivery mechanism 200. A tension spring 243 holds it in engagement with the notches 135, and also centers it therein when the magazine is brought to approximate position by the customer.

In order to prevent the shifting of the magazine when the delivery mechanism is out of normal position I provide a hole 244 in the arm 241 corresponding to a hole in the top plate of frame 201 when the arm 241 is firmly seated in one of the notches 135. A pin 245, held down out of arm 241 by a spring 246, is always entered in the hole in frame 201, and is connected at its lower end to an arm 247 which is rigidly mounted on a shaft 248, as is also an arm 249 carrying a roller 250 which rests in a depression in a cam 251 on main shaft 202 of the delivery mechanism, when said mechanism is in its normal position. As soon as the delivery mechanism is moved from its normal position the cam 251 rocks the arm 249, shaft 248, and arm 247, pushing pin 245 up into hole 244 in arm 241, thus locking arm 241 firmly to frame 201 and effectually preventing any shifting of the magazine 100. When the magazine is not in position for one of the stacks to register with the delivery mechanism the hole 244 in arm 241 will not register with the corresponding hole in the frame 201 and will make it impossible to move the delivery mechanism away from its normal position until one of the stacks in the magazine 100 is brought into operative relation with the delivery mechanism.

A simplified form of interlock, which may be used if desired, is shown in Figs. 35 and 36. In this case the arm 241 operates exactly as just described, but instead of the pin 245 and the cam and arms for operating it, there is a depending extension 241—A formed from the same piece as arm 241, which extends downward through a suitable opening in the frame 201. When the arm 241 is rocked by movement of the magazine point 241—B at the end of the extension 241—A is moved into a notch 227—N in the crank disc 227 which carries the crank for operating the plunger. It can easily be seen that this performs exactly the same functions as the interlock previously described. This form has the advantage of simplicity but must be made quite heavy to have the necessary rigidity.

Coin control

Figure 13:
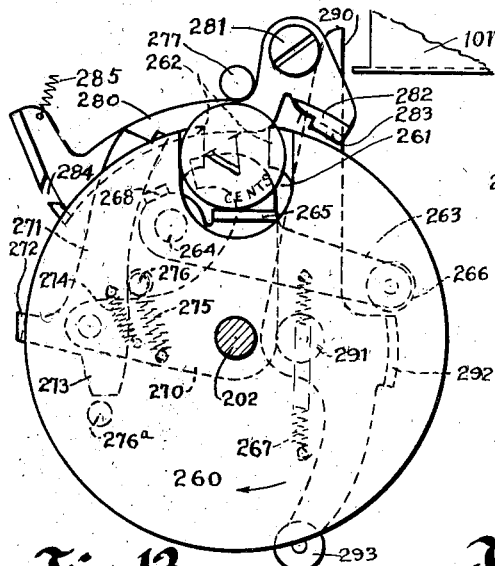
Fig. 13 shows the essential parts of the coin mechanism in their normal position, with a five cent coin inserted ready for operation.

The mechanism for gaging the coins to determine whether or not they are of proper dimension to permit operation of the machine is best shown in Figs. 9, and 13 to 16 inclusive. Coins inserted into the chute 155, which is attached to the frame 201 of the delivery mechanism and is adapted to extend up through a suitable slot in the housing 46, drop down into the mechanism as shown in Fig. 13. In a disc 260, rigidly mounted on the main shaft 202 of the mechanism, is a pocket 261 (seen also in Fig. 24) for receiving the coin, having projections 262 for supporting the side of the coin. An arm 263, which I shall hereinafter call a coin support arm, is mounted to swing on a pivot 264 fixed in disc 260, and is bent over to form a support 265 which forms a bottom to the pocket 261 and supports the coin therein at the proper height. A roller 266 is mounted on the end of this arm 263 for purposes which will presently be described. The arm 263 is shown in Fig. 13 as rocked in a clockwise direction to the limit of its motion, but it is free to move in a counterclockwise direction from this position against the tension of a spring 267. A projecting ear 268 is bent up from the arm 263 in a direction opposite to the support 265, and is used on certain occasions to rock the arm 263, as will presently be described. The relative position of one of the stacks 101 is shown in the figure by the corner portion of the stack, the rest of the stack being broken away. Loosely mounted on shaft 202 adjacent to disc 260, and separated from the disc by a distance just greater than the thickness of coin support arm 263, is another arm 270, carrying pivotally mounted thereon, between itself and the disc 260, a locking pawl 271 which has a projecting lug 272 bent away from the observer in the figures, and a cam shaped tail 273. This locking pawl is held in the position shown in Fig. 13 with relation to the arm 270 by means of a spring 274. Arm 270 is held in the position shown in Fig. 13 with relation to disc 260 by means of a spring 275 which holds it against a pin 276 fixed in the side of the disc 260. The arm 270 and pawl 271 thus normally follow the disc 260 as it rotates, and all three remain in the same relative position as shown in Fig. 13.

Figure 15:
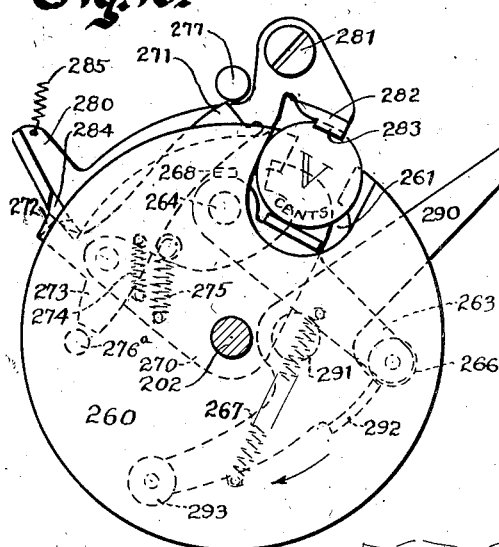
Fig. 15 shows the same parts in the position which they occupy when a five cent coin is unlocking the mechanism.
Figure 16:
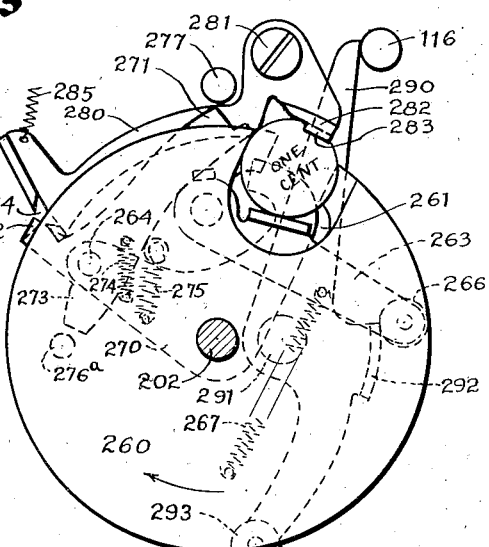
Fig. 16 shows the same parts in the position which they occupy when a one cent coin is unlocking the mechanism.

A coin measuring arm 280 is provided, mounted to rock on a center 281 fixed in framework 201 of the delivery mechanism, which framework is not shown in Figs. 13 to 16, in order that the working parts shall not be obscured thereby. This measuring arm 280 has a measuring foot 282 projecting therefrom and extending over the path of the coin as the disc 260 is rotated. The foot 282 has a rim 283 projecting therefrom which helps to prevent coins from slipping out from under the foot during the rotation of the disc, and also serves another purpose which will be described in connection with the magnetic slug extractor. The end of the arm to the left in the figure is turned up toward the observer, and this turned up portion is provided with a notch 284 through which the projecting lug 272 on the locking pawl 271 may pass when the measuring arm 280 is in the proper position. A spring 285 (not shown in Fig. 9) holds arm 280 normally in the position shown in Fig. 13. When a coin of the proper size is carried by the disc 260 under the foot 282 the measuring arm 280 is rocked to just the proper degree to permit the passage of lug 272 on the locking pawl 271, as shown in Fig. 15, and the various parts mentioned continue on their way in the same relative position as shown in Figs. 13 and 15. As soon as the coin has passed under the measuring foot 282 the arm 280 may return to its normal position as shown in Fig. 13 because the lug 272 has already passed through the notch 284. If the coin passing under the foot 282 is slightly too large or too small the lug 272 will strike one side or the other of the notch 284 and rock locking pawl 271 against the tension of the spring 274. Spring 275 holding arm 270 in position is stronger than spring 274. Therefore, the arrest of pawl 271 by the arm 280, and the resulting rotation of the pawl 271, on its pivot, will not, for the time being, prevent the movement of arm 270 in unison with the disc, unless the pawl 271 should fail to rock freely on its pivot. Should this occur, a stout pin 276ᵃ, carried by the disc 260, would impinge on the end of tail 273 of the pawl and compel the arm 270 to move with the disc. Referring to Figs. 15 and 16 it will be seen that the parts are so proportioned that at the time the lug 272 impinges on the end of the arm 280, the forward end of the locking pawl is in position to swing behind the stationary stud 277. Assuming that the lug 272 has engaged the arm 280, because the coin which has been inserted is too large or too small, or because no coin has been inserted, continued movement of the disc 260 is only possible because of the rocking of the locking pawl on its pivot. During this continued movement of the disc the pawl 271 rocks on its lug 272, in addition to rotating on its pivot, and the end of the pawl swings in behind the stud 277. A very small movement of the disc, at this time, causes the tail 273 to swing toward the shaft 202 sufficiently to allow the pin or stud 276ᵃ to engage the cam-shaped side of the tail. The spring 275 now yields and allows the arm 270 to remain stationary while the disc 260 continues to rotate, until the stud 276ᵃ impinges on the rear end of the locking pawl 271, as in Fig. 14. After the arm 270 is arrested by the engagement of the pawl 271 with stud 277, the pawl 271 is rocked on its axis a little farther, by the stud 276ᵃ operating on the cam-face of the tail 273, which results in the lug 272 receding slightly from the arm 280, as is shown in Fig. 14. Thus the force applied to disc 260 is resisted by the stud 276ᵃ, the pawl 271 and stud 277, and no strain is put on the lug 272. This forms a strong and positive lock for the mechanism, which comes into action if an attempt is made to operate the machine without a coin of the proper size having been deposited in the slot, while permitting the parts which throw the locking mechanism into action to be comparatively delicate in construction. Making these actuating parts comparatively delicate enables them to be made very accurate, and the measurement of coins to be precise. Relieving these parts of the locking strain prevents their rapid wear, if not their actual destruction.

It will be noticed in Fig. 14 that the coin which has failed to permit operation of the mechanism is being ejected therefrom. It may easily be seen that this is accomplished by the projecting ear 268 on the coin supporting arm 263 coming into contact with the hooked end of arm 270 as the disc 260 continues to rotate after movement of the arm 270 has been arrested by locking pawl 271 coming into contact with stud 277. After ear 268 on arm 263 strikes arm 270, further rotation of the disc 260 will cause the arm 263 to rock on its pivot to the position shown in Fig. 14, which positively ejects from the mechanism any coin or slug which may have been placed therein at the beginning of the operation.

Because the machine is adapted to receive different denominations of coins in payment for different kinds of goods it is quite possible that a customer may occasionally insert a coin of improper denomination by inadvertence. Furthermore very old five cent coins are occasionally found, which, though still legal tender, are far below the standard size of modern coins, and should therefore be rejected by a machine which determines the validity of coins by measurement. For these reasons it is advisable to make provision for returning rejected coins to the customer, in order that the machine shall never deprive a customer of a coin without delivering the equivalent in merchandise. The structure provided for thus returning a rejected coin is best seen in Figs. 2, 8, 23, and 24. A coin ejected as shown in Fig. 14 is ejected when the carrying pocket 261 in disc 260 is in the position designated 261—B in Fig. 23. The coin thus passes above point 325 adjacent to the disc. The ejection takes place in the plane of the normal movement of the coin, which is the plane of disc 260, and the coin consequently rolls out into chute 321 whence it slides down onto the inclined slide 43 and into pocket 44 where the customer will naturally look for the goods he has attempted to purchase.

The mechanism as so far described, and as shown in Figs. 13 and 15 is arranged to accept a five cent coin as the condition of its operation. When it is desired to cause the same mechanism to accept a coin of smaller size (either a ten cent or a one cent coin, but shown herein as the latter) it is simply necessary to provide means for rocking the coin carrying arm 263 to such an extent that it will raise the one cent coin up to the point where it will rock measuring arm 280 to the same extent which the five cent coin usually does, allowing the passage of lug 272 on locking pawl 271 through notch 284 in the measuring arm 280. The arm 263 need only be rocked to so raise the coin as the coin is passing under the measuring foot 282. In order to so rock the arm 263 in this part of the operation when a stack 111, containing goods having a selling price of one cent, is in position, and not to so rock it when a stack 101, containing goods having a selling price of five cents, is in position, I provide a determining arm 290 mounted to rock on a fixed center 291, and having a cam shaped projection 292 thereon, which projects into the path of roller 266 on arm 263 and is adapted, when arm 290 is in a certain position, to raise the coin carrying arm 263 to the required extent. Determining arm 290 normally stands in the position shown in Fig. 13 where it does not interfere with the rotation of the magazine 100. When the disc 260 is rotated the arm 290 is rocked on its center by means which will be described presently. This rocking of determining arm 290 is sufficiently rapid to keep the cam portion 292 ahead of the roller 266 on coin support arm 263, so that arm 263 is left in its lowest position, as shown in Figs. 13 and 15, where it will cause a five cent coin to rock measuring arm 280 to the position shown in Fig. 15, which allows lug 272 on locking pawl 271 to pass through notch 284 and the mechanism to operate. When a stack containing goods having a selling price of one cent is in operative relation with the delivery mechanism, the projecting stud 116, described in connection with the stacks for containing single sticks of goods, is in the position shown in Figs. 9, 14, and 16. When the stud 116 is in this position it will prevent more than a slight movement of determining arm 290.

When the determining arm is in this position cam portion 292 is so arranged that the coin supporting arm 263 will be rocked an amount sufficient to lift a one cent coin to the usual height of a five cent coin at the time the coin is passing under the measuring foot 282. That means that a one cent coin will then permit the operation of the mechanism, as may be seen in Fig. 16, just as the five cent coin does as illustrated in Fig. 15.

Figure 17:
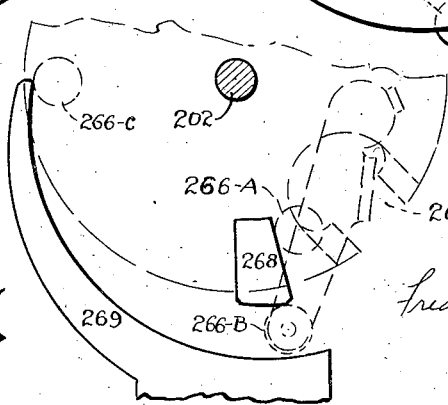
Fig. 17 shows the cam for rocking the coin supporting arm to eject coins which have permitted operation of the mechanism, and for returning this arm to its normal position. Broken lines show the coin carrying disc and arm in the position which they occupy when the coin is ejected, and also show positions which the roller thereon occupies when it first strikes, and when it leaves the cam.

To prevent dishonest customers from making repeated purchases with a single coin, by means of the common expedient of placing chewing gum or other adhesive on the sides of the coin thus causing the coin to remain in the mechanism when it should normally drop out, I provide means for positively ejecting every coin from the mechanism at each operation. I have already described how coins which fail to permit operation of the mechanism are ejected and returned to the customer. When, however, a coin has permitted operation of the mechanism and has been carried by disc 260 to the chute 324, which leads to the coin compartment 47—A of the coin drawer 47, the roller 266 on coin supporting arm 263 has reached the position 266—A as seen in Fig. 17. At this point it strikes the cam 268, (Fig. 17) which is fixed to the frame 201 as may be seen by reference to Fig. 9. The frame 201 is, however, not shown in Fig. 17. As the rotation of disc 260 continues, contact of roller 266 with cam 268 causes arm 263 to rock to the position shown by broken lines in Fig. 17, thus ejecting the coin from the mechanism in the position 261—C which, as may be seen by reference to Fig. 23, is over the coin chute 324 which carries the coin to the coin receptacle 47—A. In order to aid spring 267 and positively return arm 263 to its normal position I further provide cam 269. The position of roller 266 as it leaves this cam is shown in Fig. 17 as 266—C.

Magnetic slug extractor

The mechanism as above described will prevent operation of the machine by using coins or slugs that are not of the exact size of the required coin. However, steel slugs of almost the exact size of the required coins are frequently met with and must be guarded against. For this purpose I provide the following mechanism: A cover 301 which normally holds the coin in position in pocket 261 against projection 262. This cover is adapted to rock on a pivot 302 and is normally held against disc 260 by means of spring 303. (See also Figs. 23 and 24.) A magnet 310 is mounted adjacent to the path of the coin when the disc 260 starts to rotate. Below this magnet is a piece 311 of non-magnetic metal which prevents slugs from hanging on to the magnet. It will be seen by reference to Fig. 24 that this piece 311 is so formed as to hold the cover 301 in position until the rotation of disc 260 has begun. This prevents magnet 310 from pulling a slug which may be in pocket 261 towards itself while the pocket is still in position below coin chute 155. This would be objectionable because it would make it possible to drop a coin or another slug into pocket 261 by the side of the slug attracted by the magnet. It is possible that, under certain conditions, this might interfere with the proper functioning of the mechanism, so I provide the projection 312 on non-magnetic part 311, which holds cover 301, and thereby any slug which may be in pocket 261, in position until pocket 261 is no longer under coin chute 155. The slug will then be disposed of in a manner about to be described and any other coin which might be inserted into chute 155 would ride on the periphery of disc 260 until the empty pocket 261 again came under the chute.

As soon as the cover 301 has passed the projection 312 on plate 311 the magnet 310 will tip the slug and the cover 301 outward to the position shown by broken lines in Fig. 9. When the slug has been tipped to this position it will pass outside the rim 283 on measuring foot 282, and therefore will not serve to rock measuring arm 280 to unlocking position. Thus the mechanism will be locked exactly as previously described, and the slug will be ejected by the rocking of coin support arm 263 just as was the case with a coin of improper dimension. One difference, however, should be noted. The rejected coin, as has been explained, is ejected in the plane of its normal movement and therefore falls into chute 321 and is thus returned to the customer. It is desirable not to return a slug to the customer because it is better not to permit repeated attempts to operate the mechanism with a single slug. If this were possible it would be done repeatedly in the hope of eventually operating the machine with the slug, but if every slug inserted remains in the machine the attempted abuse of the machine in this manner is not likely to be continued. That the slug ejected from the mechanism will be retained inside the machine will be apparent from the fact that because the slug passes outside of the rim 283 on measuring foot 282 it must also pass outside the rim 322 of return chute 321 and consequently fall into chute 323 which leads into the slug compartment 47—B of the coin drawer 47. (See also Fig. 2.) It should be noted that the bottom of chute 323 fits against the side of magnet 310 (see Figs. 23 and 24) and is made of non-magnetic material so that after the slug is carried past the magnet by rotation of the disc 260 the slug will be freed from magnetic influence and slide freely down the bottom of the chute. It should also be noted that certain of the associated parts are made of non-magnetic metal in order not to interfere with the proper action of the magnet.

Means for preventing improper return of coin

Reference to Fig. 14 will show that the coin is well past the measuring pawl 280 when the locking and ejection take place. Thus it is that, if no means were provided for preventing it, after a proper coin had passed under measuring foot 282 and unlocked the mechanism, a quick turn of the disc 260 might cause sufficient centrifugal force to throw the coin out into the chute 321 where it would be returned to the customer, who would then receive both the goods and the coin which he had used to purchase it. To prevent this I provide a pawl 331, shown best in Fig. 23, but omitted from Fig. 24. This pawl rocks on pivot 332 in side 322 of chute 321, and is held in the position shown by means of spring 333. The pawl is thus directly in the path of any coin which would be thrown out or ejected into chute 321. The spring 333 is strong enough to prevent the throwing out of a coin by centrifugal force. The ejection takes place, however, at point 261—B and by the power applied by the operator, which is thus sufficient to lift the pawl 331 against the tension of spring 333 and force the coin into chute 321 from which it will return to the customer.

Method of returning mechanism from locked to normal position

I have already described how the mechanism is locked when an attempt is made to operate it without using a proper coin. In order that this locking may take place, the main shaft 202 of the mechanism must be turned, as I have said, to bring the coin carrying disc 260 from its normal position shown in Fig. 13 to the locked position shown in Fig. 14. If the mechanism then had to be turned back to normal position by the customer the chances are that it would remain in the locked position. It would then be impossible for a coin to get from coin chute 155 into the mechanism, and the machine could not be operated unless the customer knew enough to turn the mechanism backwards. In order that the mechanism shall always be in a position to receive a coin which may be placed into chute 155 I provide means for returning it from its locked to its normal position as soon as the customer releases his hold upon it. The mechanism by which this is accomplished is shown in Figs. 18 to 22 inclusive. The crank disc 227 which carries the roller 225 for operating the delivery plunger 210, as already described, is mounted on the end of shaft 202. On the opposite side of disc 227 is fixed a second disc 327 which forms the internal spiral cam 328 which has a straight side 329. In Fig. 18, which shows the parts of the mechanism in their normal positions, it will be seen that a roller 340 normally rests against the straight side 329. The roller 340 is mounted on an arm 341 which is mounted to rock on stud 291 which is fixed in frame 201. A tension spring 343 tends to rotate arm 341 in a counter-clockwise direction. Thus, when the mechanism is turned from its normal position to its locked position, shown in Fig. 19, it is turned against the action of spring 343, which is thus extended due to the rocking of arm 341 by the pressure of cam face 329 against roller 340. If the mechanism is then released the spring 343 will rock arm 341 in a counter-clockwise direction and, by the pressure of roller 340 on the straight face 329 of the spiral cam, will return the disc 327, and thereby the whole mechanism, to its normal position shown in Fig. 18. If, however, the mechanism is not locked when it comes to the position shown in Fig. 19, the mechanism will continue to be turned in a clockwise direction and roller 340 will ride up off of the straight face 329 onto the curved face 328 of the spiral cam. The arm 341 will then be rocked no farther and, by the time the rotation of the disc is completed, it will again be in its normal position as shown in Fig. 18. Figs. 20 and 21 show the arm rocked to the limit of its motion.

After the mechanism has passed the locking point it is held against backward motion by means of pawl 351 and ratchet 352 on the periphery of the disc 327, as shown in Fig. 18. A toothless area on the disc 327 permits motion of the disc in both directions between the normal and locking positions. An alternative construction using a roller ratchet is shown in Fig. 19. Here the roller 355 will wedge between the periphery of disc 327, and the fixed surface 356, and prevent a backward motion of the mechanism. A cut out portion 357 of the periphery of disc 327 allows motion in both directions between the normal and locking positions, as was above described as necessary. A spring, not shown, may be added to hold roller 355 in position, if gravity is not sufficient. No ratchet is shown in any of the other figures of the drawings but it should be understood that either type of ratchet desired can be used in any case, it being simply necessary to allow motion in both directions up to the locking point but not beyond it.

*Method of operating determining arm*

The mechanism above described is also used for the operation of the determining arm 290 which, as described in connection with the coin control, determines from the stack of goods which has been set to position, what denomination of coin shall be required to permit operation of the mechanism. As will have been noted, the arm 341, just described, is mounted on the same center 291 as is the determining arm. Reference to Fig. 22 will show that the determining arm 290 is not mounted to rock directly on center 291, but on the hub 342 of the arm 341, which is mounted on the center 291. A torsion spring 345 tends to cause determining arm 290 to follow the clockwise rocking of arm 341, but allows it to lag behind when arrested by stud 116 on a stack of one cent goods. A pin 344 projecting from arm 341 and serving as a point of attachment for spring 343, positively returns determining arm 290 to normal position when arm 341 is returned to normal position. (See also Fig. 9.) Determining arm 290 is mounted on the hub 342 of arm 341 so that any sticking on its bearing will tend to aid rather than prevent its following the movement of arm 341, thus removing any danger, which there otherwise might be, of arm 290 sticking and causing the mechanism to operate with a one cent coin where it should operate only with a five cent coin.

*Method of operating counter to register amount of money received*

Instead of providing a separate counter for coins of each denomination I prefer to provide a single counter and means for actuating it to count at each operation the value of the coin which has permitted that operation, so that a single reading of a single counter will give the total amount of money taken in by the machine. The means which I prefer to use for accomplishing this end is shown in Figs. 18 to 21, inclusive. I use an ordinary star wheel counter which counts one for each tooth of the star wheel, in the form shown five for each revolution. This is mounted on a part 201—C of the frame 201, which is not shown in these figures but may be seen in Fig. 2. To operate this counter I provide a segment 361 having a cylindrical flange 362 and five projecting teeth 363 each of which is adapted, under proper circumstances, to engage a tooth of the star wheel and turn it to register one on the counter. This segment is mounted by means of a pivot 364 on the disc 327 and is held by spring 365 against pin 366 in disc 327, as shown in Figs. 18, 19, and 20. When in this position the first of the teeth 363, designated in Fig. 20 as 363—A, will engage and turn the star wheel one unit. The other teeth 363, as may be seen in Fig. 20, will not touch the star wheel.

It is necessary, when a five cent coin has been accepted, to rock segment 361 on its pivot until it becomes concentric with disc 327 and each of the five teeth 363 will then engage the star wheel and turn it one unit. The mechanism for doing this will now be considered. As will be seen in the figures, the determining arm 290 carries at its lower extremity a roller 293, (see also Fig. 9) which, when stud 116 on a stack of one cent goods arrests arm 290 in the position shown in Fig. 20 causing the mechanism to accept a one cent coin as a condition of its operation, does not interfere with the rotation of segment 361 in the position where only one tooth (363—A) will engage the star wheel. When, however, a stack of five cent goods is in position there is no stud 116 to arrest arm 290 which therefore rocks to the position shown in Fig. 21. When arm 290 is in this position, flange 362 on segment 361 rides over roller 293 raising segment 361 and holding it concentric with disc 327 until the last of the teeth 363 has passed the counter which has then been actuated to count five units, i. e. the value of the coin permitting that operation. As soon as the last of the teeth 363 is past the counter flange 362 passes roller 293 and spring 365 returns segment 361 to its normal position shown in Fig. 18.

It should be noted that the counter 360 is located so it can be read through the opening in the housing 46 when the coin drawer 47 is removed, as may be seen by reference to Fig. 2.

*Safety hand wheel*

A hand wheel 370 (see Figs. 1, and 9 to 12, inclusive) is provided on the main shaft 202 of the coin controlled delivery mechanism, by means of which the customer operates the mechanism after inserting the proper coin. If this hand wheel were rigidly secured to the shaft 202 it might be possible to put too severe a strain on the locking mechanism, or other parts of the device. In order to prevent this I provide a friction drive from the hand wheel to the shaft, so arranged that it will yield and allow the hand wheel to slip on the shaft before an unduly great strain is thrown upon the locking devices or other parts of the mechanism. I prefer to make this friction drive of the form shown in Fig. 9. In this form the hand wheel 370 is of a working fit on sleeve 371 which is secured to shaft 202 by means of a taper pin 372, or other suitable device. Sleeve 371 has a head which fits into a counterbore in the end of hand wheel 370. Between these two is a friction washer 373 of fibre, leather, or other suitable material. This is clamped to secure the desired degree of frictional resistance to slipping, by means of the nuts 375, which are screwed onto the sleeve 371. A keyed washer 374 prevents the slipping of the wheel 370 on the sleeve 371 from changing the adjustment of the nuts 375. A hole 376 in the hub of the wheel 370 permits the insertion or extraction of the pin 372 holding sleeve 371 on the shaft. It should be noted that the adjusting nuts and fastening devices are located inside of the housing 45 which encloses the mechanism of the machine, thus making it impossible to tamper with the mechanism without having the key to the coin drawer 47 to give access to the inside of the machine, as described in explaining the construction of the framework of the machine.

An alternative construction of the friction drive hand wheel is shown in Figs. 10 and 11. In this case the hand wheel 380 is mounted to slip over a sleeve 381 which is secured to shaft 202 by means of the taper pin 382, inserted, as in the previous case, through a hole in the hand wheel hub. Driving notches 381—A are provided in the enlarged end of sleeve 381. A plunger 383 is arranged to slide in a hole in the body of the wheel 380 and bear against the enlarged portion of sleeve 381. It is pressed inward by a spring 384 in such a manner as to engage the notches 381—A and turn the shaft when the hand wheel is turned. If too great a force is exerted upon the hand wheel when shaft 202 is not free to rotate, the plunger 383 will slip out of notch 381—A and allow the hand wheel to slip on the sleeve 381, and thus on shaft 202. The opposite sides of the notches may be made of different angles, as shown in the drawings, if it is desired to have less resistance to the slipping of the hand wheel in a backwards than in a forward direction. A collar 385 secured to shaft 202 by means of a pin 386 holds the hand wheel from slipping endwise on the sleeve.

Still another alternative form of hand wheel is shown in section in Fig. 12. In this case sleeve 391 has driving notches 391—A in its projecting end, and is adapted to be driven by a roller 395 which is held into the notches by a spring 397. The roller 395 is compelled to turn with the wheel 390 by means of the ends of the roller riding in slots 396 in the hub of the hand wheel. In order to hold the hand wheel onto the sleeve and to prevent interference from the outside, a thimble 393 is placed over the end and around the outside of the hub of the wheel, where it is secured by means of a screw 394 which can only be reached from inside the housing 45 of the machine.

Modifications for Handling Flimsy Goods

It is possible that the goods to be handled may be too soft to stand rigid when supported only on the partial bottoms shown in the stacks as already described. In this case it may be necessary to omit cutting out the portions 103 or 113 and make the bottoms 104 or 114 the entire length of the goods. This would necessitate an increase in the length of the stroke of the plunger 210. If it were not desirable to increase the size of the crank disc 227 the increased stroke of the plunger could be secured as shown in Fig. 34. Here the plunger 410 is operated by a roller 412 operating in the slot 411 therein. This roller 412 is carried by an arm 414 mounted to rock on a fixed center 415. The arm 414 is rocked to move the plunger in its guides by means of roller 416 on crank disc 227 operating in slot 413 exactly as the plunger 210 was operated. The stroke is made of a length which will push the goods entirely through the stack 401. With this arrangement it may be necessary either to enlarge the central diameter of the magazine or to notch out the center column 42 in order to get sufficient space into which the plunger 410 can push the goods from the stack.

Modifications for Handling Three Different Denominations of Coins

In the mechanism hereinbefore described it is only necessary to provide for goods having selling prices of one cent and five cents. The same mechanism could, however, be used to vend goods requiring five cent and ten cent coins, or coins of any other two denominations desired, by simply making the mechanism of the proper size and proportions. It is possible that packages of goods costing ten cents may be developed which it would be desirable to add to the stock of one cent and five cent goods sold by my machine. Or it might be desirable to vend goods having three different selling prices represented by coins of other denomination. This could be done by a form of mechanism similar to that which I have described.

In Fig. 32 I have illustrated my mechanism as modified to accept one, five, and ten cent coins. This is similar to that hereinbefore described except that in place of the single determining arm 290 I now provide two similar arms 490—A and 490—B, mounted side by side on the same center. Arm 490—A has a cam 492—A adapted to rock coin carrying arm 263 the amount required to cause a one cent coin to permit operation of the mechanism. Arm 490—B has a cam 492—B which raises the coin carrying arm 263 enough to cause a ten cent coin to permit operation of the mechanism. Arm 490—A is held in operative position, as shown in Fig. 32, by stud 116 projecting from the side of a stack containing one cent goods, just as previously described. The stud 116 is just long enough to hold arm 490—A but not long enough to prevent rocking of arm 490—B (which is in front of arm 490—A as seen in the figure) to the position shown in the figure. The stacks containing ten cent goods carry a stud similar to 116 but enough longer to retain both arm 490—A and arm 490—B. The cam 492—B, being the larger, is the one which will permit operation of the machine. Additional arms could be added, if desired, to cause the mechanism to function with a still greater variety of coins.

A slightly different mechanism for the same purpose is illustrated in Fig. 33. A single arm 590 is used instead of the two arms 490—A and 490—B. This arm has two branches A and B and two corresponding cam portions 592—A and 592—B, of sizes similar to the cams 492—A and 492—B just described. The one which is controlling the height of arm 263 at the critical time depends upon which of the two branches A or B is held by one of the studs 116. In this case, instead of having the studs of different lengths depending upon the selling price of the goods in the stack, they are located at different heights as shown in the figure. The branches A and B of the arm 590 are of different lengths so that stud 116—A holds the arm in a position to cause cam 592—A to control the height of the coin support arm 263 at the critical moment and cause a one cent coin to permit operation of the mechanism. Stud 116—B, which is provided on stacks of ten cent goods, would catch the shorter arm B, which will pass under the stud 116—A, and cause cam 592—B to control the height of coin support arm 263 at the time the coin is being carried under the measuring foot, thus causing a ten cent coin to permit operation of the mechanism and any other coin to be rejected as previously described. With this form of mechanism it is necessary to slightly increase the idle motion of the mechanism before locking occurs in order to give the arm 590 opportunity to rock the greater distance required. This might be taken care of in other ways but I prefer to simply increase the idle motion in order to avoid changing the form and dimensions of the other form and dimensions of the other parts which are interchangeable with the mechanism hereinbefore described.

The method of controlling the counter in this case has not been illustrated in the drawings, but it would be like that already described, using segments having the proper number of teeth, and controlled by the different arms 490 or the different positions of the arm 590 in a manner similar to that in which the segment 361 is controlled in the device as described.

Other Modifications

These are just a few of the many modifications in my device which may be possible or necessary to adapt it to various conditions of the trade. For example, various sizes or shapes of stacks could be used for other kinds of goods; or the stacks might be mounted side by side to form a sliding instead of a rotatable magazine; some form of nut could be used to hold the canopy if an electric sign is not desired; different denominations of coins, or specially made slugs could be used by properly proportioning the various parts; the frames, mountings and general arrangement could be modified to suit the goods to be sold and the situation in which the machine is to be used. I therefore do not wish to be understood as limiting myself to the particular forms herein illustrated as many modifications could be made by those skilled in the art within the scope of my invention as defined by the appended claims.

What I claim is:

1. In a vending machine, a magazine containing articles of different values, each of which values is equal to the value of a certain coin, the coins of each value being different in size from coins of the other values, a delivery mechanism adapted to deliver said articles one at a time, means for putting an article of any of said values into such relationship with said mechanism that when the mechanism is operated the article will be delivered, means for adjusting said delivery mechanism so it will be operative when a coin of a given size is lodged therein, and so it will be inoperative if a coin of any other size is lodged therein, and means whereby, when an article is put into such relationship with the delivery mechanism that said article will be delivered when the mechanism is operated, the mechanism is automatically adjusted so it will be operative when a coin of the size corresponding to the value of said article is lodged therein.

2. In a vending machine, a magazine containing articles of different values, said articles being divided into groups according to their respective values, each of which values equals the value of a certain coin, the coins of each value being different in size from coins of the other values, a delivery mechanism adapted to deliver said articles one at a time, means for putting any group of articles into such relationship with said mechanism that when the mechanism is operated an article from the group will be delivered, means for adjusting the delivery mechanism so it will be operated when a coin of a given size is lodged therein, and so it will be inoperative if a coin of any other size is lodged therein, and means whereby, when a group is put into such relationship with the delivery mechanism that an article from said group will be delivered upon operation of the mechanism, the mechanism is automatically adjusted so it will be operative when a coin of the size corresponding to the value of the articles in said group is lodged therein.

3. In a vending machine, a magazine containing articles of different values, said articles being arranged in stacks according to their respective values, each of which values equals the value of a certain coin, the coins of each value being different in size from the coins of the other values, a single delivery mechanism adapted to deliver articles one at a time from a stack, said magazine being revoluble to bring said stacks one at a time into such position relative to the delivery mechanism that when the mechanism is operated an article from said stack will be delivered, means for adjusting said delivery mechanism so it will be operative when a coin of a given size is lodged therein, and so it will be inoperative if a coin of any other size is lodged therein, and means whereby, when a given stack is in delivery relationship with said delivery mechanism, said mechanism is so adjusted that it will not be operative unless a coin of a size corresponding to the value of the articles in said stack is lodged therein.

4. In a vending machine, a magazine containing articles of different values, each of which values is equal to the value of a certain coin, the coins of each value being different in size from coins of the other values, a delivery mechanism adapted to deliver said articles one at a time, means for putting an article of any of said values into such relationship with said mechanism that when the mechanism is operated the article will be delivered, means for adjusting said delivery mechanism so it will be operative when a coin of a given size is lodged therein, and so it will be inoperative if a coin of any other size is lodged therein, means whereby, when an article is put into such relationship with the delivery mechanism that said article will be delivered when the mechanism is operated, the mechanism is automatically adjusted so it will be operative when a coin of the size corresponding to the value of said article is lodged therein, and means for returning coins that are either too large or too small.

5. In a vending machine: a rotatable magazine containing a plurality of stacks of goods which may have different selling prices; coin controlled delivery mechanism; means whereby said magazine may be rotated to bring any one of said stacks into operative relation with said delivery mechanism; a member which moves at each operation of the delivery mechanism, and means for arresting said member on occasion whereby the denomination of coin required to permit operation of said delivery mechanism is determined, said arresting means being employed when an article of one value is to be delivered and not employed when an article of another value is to be delivered.

6. In a vending machine: a magazine containing a plurality of stacks of goods; coin controlled delivery mechanism; means whereby any one of said stacks may be brought into operative relation therewith; means for causing a coin of correct dimention to permit operation of the machine; means for returning a coin to the customer if the coin be over or under size; means for preventing a steel slug from permitting operation; and means for retaining steel slugs inside the machine.

7. In a coin controlled mechanism: a coin carrying member; a measuring device for measuring the diameter of a coin carried by said member; automatic means for shifting, on occasion, the position of a coin on said member so that a coin of smaller diameter will affect said measuring device to the same extent as a coin of larger diameter.

8. In a coin controlled mechanism: a coin carrying member; a measuring device for measuring the dimension of a coin carried by said member; a locking pawl which contacts with said measuring device and is rocked to locking position thereby when the coin being measured is of incorrect dimension; and means whereby, as the locking takes place, said locking pawl is withdrawn from contact with said measuring device, relieving said device of all strain incident to the locking action.

9. In a coin controlled mechanism: a device for accurately measuring the dimension of a coin; a locking device; means whereby said locking device is controlled by said measuring device; and means whereby said measuring device is relieved of all strain in the locking of the mechanism.

10. In a coin controlled mechanism: a coin carrying disc, arranged to turn with the mechanism; an arm mounted adjacent thereto, and movable to a limited extent in relation thereto; a locking pawl pivotally mounted on said arm; a stud projecting from said disc; a fixed stud; and means for rocking said locking pawl on its pivot to a position where it takes a direct pressure between said two studs, thus forming a positive lock, when an attempt is made to turn said mechanism without inserting a proper coin.

11. In a coin controlled mechanism: a coin carrying member; a stud projecting therefrom; a fixed stud; and a locking pawl, and means whereby said pawl is interposed between said two studs to lock said member against operation, when a proper coin is not used.

12. In a coin controlled mechanism: a coin carrying disc; a stud projecting therefrom; a fixed stud; a locking pawl, means whereby said pawl is interposed between said two studs to lock said disc against rotation when a proper coin is not used; a hand wheel for operating the mechanism; and a friction drive between said hand wheel and the mechanism, for preventing excessive strain on the locking devices.

13. In a coin controlled mechanism: a coin carrying disc; an arm mounted adjacent thereto, and adapted to rock to a limited extent in relation thereto; a locking pawl pivotally mounted on said arm; means for rocking said pawl to locking position, means for subsequently rocking said arm, with reference to said disc, and means for causing the ejecting of any improper coin which may be carried by said disc, before the disc is finally locked.

14. In a coin controlled mechanism: a coin carrying disc; an arm mounted adjacent thereto, and adapted to rock to a limited extent with reference thereto; a locking pawl pivotally mounted on said arm; means for rocking said pawl to locking position, and means for subsequently rocking said arm, with reference to said disc, before said disc is finally locked due to lack of a proper coin; and means for positively preventing the rocking of said arm before the rocking of said pawl to locking position.

15. In a coin controlled mechanism: a coin carrying member; a coin supporting arm pivotally mounted thereon; and means whereby said arm may be rocked at any operation of the mechanism to a position enabling a small coin to accomplish the function of a larger coin when an article of the value of the small coin is wanted.

16. In a coin controlled mechanism: a coin carrying member; a coin supporting arm pivotally mounted thereon; and means for rocking said arm to lift the coin the proper amount when it is required that a smaller coin than usual shall permit operation of the mechanism.

17. In a coin controlled mechanism: a coin carrying member; a coin supporting arm pivotally mounted thereon; means for rocking said arm to lift the coin the proper amount when it is required that a smaller coin than the normal shall permit operation of the mechanism; means for rocking said arm to a much greater extent to eject a coin which fails to permit operation of the mechanism.

18. In a coin controlled mechanism: a coin carrying member; a coin supporting arm pivotally mounted thereon; means for rocking said arm to lift the coin the proper amount when it is required that a smaller coin than the normal shall permit operation of the mechanism; means for rocking said arm to a much greater extent, when the mechanism becomes locked, to eject anything which may be carried by said coin carrying member and has failed to permit operation of the mechanism.

19. In a coin controlled mechanism: a coin carrying member; a coin supporting arm pivotally mounted thereon; means for rocking said arm to lift the coin the proper amount when it is required that a smaller coin than normal shall permit operation of the mechanism; means for rocking said arm to a much greater extent, in the normal operation of said mechanism, to eject a coin which has permitted operation of the mechanism.

20. In a coin controlled mechanism: a coin carrying disc; means for measuring the dimension of a coin carried thereby; means whereby, if a coin is of improper dimension, the mechanism will be locked and the coin ejected where it will be returned; means whereby, if the coin is of proper dimension, the mechanism will be permitted to operate; and means for preventing centrifugal force due to a quick rotation, from throwing out a coin of proper dimension where it will be returned.

21. In a coin controlled mechanism: a coin carrying disc; a coin supporting arm pivotally mounted thereon; a measuring device for measuring the dimension of a coin carried by said disc; an arm mounted adjacent to said disc, and adapted to rock to a limited extent in relation thereto; a locking pawl pivotally mounted on said arm; means whereby, when an attempt is made to operate said mechanism without a coin of proper dimension, said locking pawl will contact with said measuring device rocking said pawl to locking position and locking the arm to which it is pivoted against further movement; and further means whereby rotation of said disc may be continued till said coin supporting arm contacts with said locking pawl carrying arm, and is rocked thereby to an extent sufficient to eject from the mechanism anything carried by said coin carrying disc.

22. In a coin controlled mechanism: a coin carrying member; yielding means for holding a coin placed therein; a coin measuring device mounted adjacent thereto; a magnet mounted by the side of the path of the coin in such a manner that a steel slug will be pulled out of the plane of engagement with said measuring device.

23. In a coin controlled mechanism: a coin carrying member; yielding means for holding a coin in place therein; a coin measuring device mounted adjacent thereto; means for ejecting coins which do not measure up to the standard required; a magnet mounted adjacent to the path of the coin in such a manner that a steel slug will be pulled out of the plane of engagement with said measuring device; and means whereby said ejecting means will also eject such slugs.

24. In a coin controlled mechanism: a coin carrying disc; yielding means for holding a coin in place therein; a coin measuring device mounted adjacent thereto; means for ejecting, in their plane of rotation, coins which do not measure up to the required standard; a magnet mounted adjacent to the path of the coin in such a manner that a steel slug will be pulled out of the plane of rotation of a coin, so that it will not engage said measuring device; and means whereby said ejecting means will eject such a slug in the plane to which it has been pulled by said magnet.

25. In a coin controlled mechanism: a coin carrying disc; yielding means for holding a coin in place therein; a coin measuring device mounted adjacent thereto; means for ejecting, in a place where they will be returned, coins which do not measure up to the required standard; a magnet mounted adjacent to the path of the coin in such a manner that a steel slug will be pulled out of the plane of engagement with said measuring device; and means whereby said ejecting means will eject such a slug in a place where it will be retained.

26. Means for causing a coin controlled mechanism to accept coins of different denomination at different operations, comprising: an arm which, when in one position, allows the mechanism to accept a coin of one denomination, and when in another position causes said mechanism to accept a coin of another denomination; a second arm, which is rocked in one direction during the first part of each operation of said mechanism, and returns to normal position by the completion of the operation; yielding means for causing said first arm to follow the motion of said second arm; and a stop adapted to prevent said first arm from following said second arm when it is required that the mechanism accept coins of one denomination.

27. In a coin controlled mechanism: an arm which, when in one position, permits said mechanism to accept a coin of one denomination, and, when in another position, causes said mechanism to accept a coin of another denomination; yielding means for moving said arm at each operation of the mechanism; and a removable stop which is adapted to arrest the movement of said arm in one of said two positions, when coins of corresponding denomination should be accepted.

28. In a vending machine: a single coin controlled mechanism means for causing coins of different denomination to permit operation of said mechanism; a counter for counting the money taken by the machine; and means for actuating said counter, at each operation of the machine, a number of units corresponding to the value of the coin permitting the particular operation.

29. In a vending machine: a single coin controlled mechanism means for causing coins of different denomination to permit operation of said mechanism; a star wheel counter for counting the amount of money taken by the machine; and means for turning said star wheel, at each operation of the machine, a number of units corresponding to the value of the coin received at that particular operation.

30. In a coin controlled vending machine: means for causing coins of different denomination to permit operation of the machine, according to the selling price of the goods being sold; a star wheel counter for counting the money taken by the machine; a segment containing teeth for operating said counter; means, controlled by said means for controlling the denomination of coin which will permit operation of the machine, for varying the number of teeth of said segment which will engage said star wheel, according to the value of the coin permitting that particular operation.

FREDERICK G. L. BOYER.